US009443231B2

(12) United States Patent
McPhee

(10) Patent No.: US 9,443,231 B2
(45) Date of Patent: Sep. 13, 2016

(54) PROVISION OF PREDEFINED COMMUNICATIONS

(71) Applicant: Legacy Media, LLC, Salem, NY (US)

(72) Inventor: Donald P. McPhee, Salem, NY (US)

(73) Assignee: LEGACY MEDIA, LLC, Salem, NY (US)

( * ) Notice: Subject to any disclaimer, the term of this patent is extended or adjusted under 35 U.S.C. 154(b) by 274 days.

(21) Appl. No.: 14/203,682

(22) Filed: Mar. 11, 2014

(65) Prior Publication Data
US 2014/0280588 A1 Sep. 18, 2014

Related U.S. Application Data

(60) Provisional application No. 61/792,840, filed on Mar. 15, 2013.

(51) Int. Cl.
*A47K 3/00* (2006.01)
*G06Q 10/10* (2012.01)
*G06Q 50/00* (2012.01)

(52) U.S. Cl.
CPC ............ *G06Q 10/109* (2013.01); *G06Q 50/01* (2013.01); *A47K 3/00* (2013.01)

(58) Field of Classification Search
CPC ....................................................... A47K 3/38
USPC ..................................................... 4/596–614
See application file for complete search history.

(56) References Cited

U.S. PATENT DOCUMENTS

| 5,103,498 | A | 4/1992 | Lanier et al. |
| 6,697,810 | B2 | 2/2004 | Kumar |
| 7,577,724 | B1 | 8/2009 | Jalagam et al. |
| 7,873,559 | B2 | 1/2011 | Mallozzi |
| 8,005,910 | B2 | 8/2011 | Ouchi |
| 8,108,397 | B2 | 1/2012 | Kawai et al. |
| 8,229,734 | B2 | 7/2012 | Bennett |
| 8,301,705 | B2 | 10/2012 | Wagner et al. |
| 8,306,056 | B2 | 11/2012 | O'Brien et al. |
| 8,312,095 | B2 | 11/2012 | Chao |
| 8,375,308 | B2 | 2/2013 | Fuchs |
| 2009/0063491 | A1 | 3/2009 | Barclay et al. |
| 2010/0235758 | A1 | 9/2010 | Shen |
| 2010/0274861 | A1 | 10/2010 | Asiedu |
| 2012/0136781 | A1 | 5/2012 | Fridman et al. |

OTHER PUBLICATIONS

International Search Report and Written Opinion in related PCT Application No. PCT/US14/23479, dated Jul. 14, 2014, 16 pages.

*Primary Examiner* — Lori Baker
(74) *Attorney, Agent, or Firm* — Matthew M. Hulihan; Heslin Rothenberg Farley & Mesiti, PC

(57) ABSTRACT

A communication is received from a first user and stored as a predefined communication. The predefined communication is associated with an account associated with the first user, and subsequent to the receiving and the associating, the account is activated for provision of the predefined communication to a second user predefined by the first user. The predefined communication is automatically provided to the second user based on a determination that a triggering event for providing the predefined communication has been satisfied.

25 Claims, 10 Drawing Sheets

PROVISION OF PREDEFINED COMMUNICATIONS

CROSS REFERENCE TO RELATED APPLICATIONS

This application claims priority under 35 U.S.C. §119(e) to U.S. Provisional Patent Application Ser. No. 61/792,840 filed Mar. 15, 2013 entitled, "PREDEFINITION OF COMMUNICATIONS TO FACILITATE COMMUNICATION BETWEEN A DECEDENT AND SURVIVORS", the content of which is hereby incorporated herein by reference in its entirety.

BACKGROUND

The death of a loved one is an emotionally challenging situation with lasting effects. Memories can provide some sense of comfort for a surviving individual, but those memories are dependent largely on what the surviving individual is able to recall.

BRIEF SUMMARY

Shortcomings of the prior art are overcome and additional advantages are provided through the provision of a method which includes receiving, by a processor, a communication from a first user and storing the communication as a predefined communication; associating the predefined communication with an account associated with the first user; subsequent to the receiving and the associating, activating the account for provision of the predefined communication to a second user predefined by the first user; and automatically providing the predefined communication to the second user based on a determination that a triggering event for providing the predefined communication has been satisfied.

Further, a system is provided which includes a processor and a memory in communication with the processor. The system is configured to perform receiving a communication from a first user and storing the communication as a predefined communication; associating the predefined communication with an account associated with the first user; subsequent to the receiving and the associating, activating the account for provision of the predefined communication to a second user predefined by the first user; and automatically providing the predefined communication to the second user based on a determination that a triggering event for providing the predefined communication has been satisfied.

Yet further, a computer program product is provided which includes a tangible computer readable storage medium storing program instructions for execution by a processor to perform a method which includes receiving a communication from a first user and storing the communication as a predefined communication; associating the predefined communication with an account associated with the first user; subsequent to the receiving and the associating, activating the account for provision of the predefined communication to a second user predefined by the first user; and automatically providing the predefined communication to the second user based on a determination that a triggering event for providing the predefined communication has been satisfied.

Additional features and advantages are realized through the concepts of aspects of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
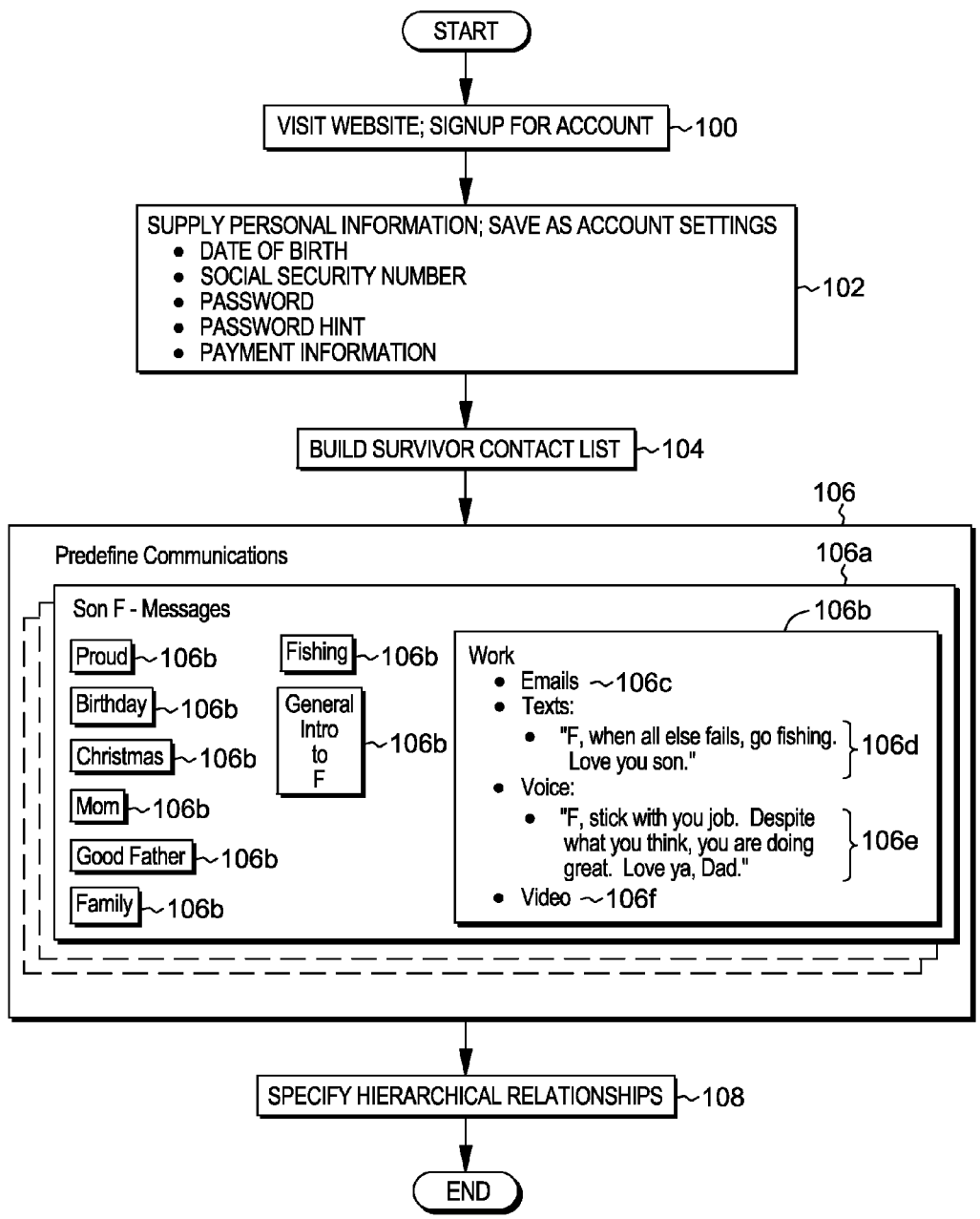
FIG. 1 illustrates an account setup and initial definition of communications, in accordance with aspects described herein.

Recognizing that the grief process is mostly internal for those who have lost a loved one, such as a relative or friend, without the benefit of communication with the deceased loved one, aspects described herein facilitate provision of communications, set up by an individual during his or her lifetime, to be provided to specified persons after the individual is deceased. The individual setting up the communications during his or her lifetime may be referred to herein as "decedent", "deceased individual", "account owner", or "owner", as examples. Surviving spouses, children, siblings, friends and others are able to receive these predefined communications from the deceased individual by way of prerecorded media (voice, text, email, video, etc) provided by the decedent during his or her lifetime. Voice, text, email, video, graphics, and other content/communications predefined by the decedent during his or her lifetime may be collectively referred to herein as "predefined communications", "predefined content", messages, "content", or "media". The decedent, while alive, can predefine various communications and optionally target them for particular individuals, to be provided at some time after the decedent has died. These predefined communications can be provided, in some examples, as responses to received communications from survivors, and categorized for reply to a survivor when the survivor communicates with a decedent's account facilitating such communications (e.g. telephone number, email address, social media accounts, etc.).

In some embodiments, predefined communications are provided to authorized users who have access to aspects of the decedent's prepaid and preplanned account—worldwide. Authorized users include, for instance, surviving individuals (mother, father, child, sibling, close friend, coworker, or others) specified by the decedent during the decedent's lifetime.

Facilities described herein provide services for the sharing of media after the decedent has died. Such media is hereby termed 'legacy media'. Opportunities are provided to individuals (as both an account owner and/or survivor of a deceased account owner) to engage in real time exchanges/conversations via communication channels such as email, text, audio, video, and/or holographic messaging with loved ones, friends or other acquaintances who have passed. These facilities help bridge a communication gap between a decedent and survivors of that decedent, affording the survivors the opportunity to receive spontaneous or invited communications, from the decedent in the days, weeks, months or years following the death of the decedent. Receipt of such communications long after the individual has passed away can provide some comfort to the grieving survivors through the unique words, messages, and thoughts of the decedent.

Although modes of communication according to examples described herein typically involve text messaging and email, other modes of communication are possible, such as telephone, physical mail, facsimile, etc, as well as website-accessible communications hosted through a website providing facilities described herein which stores video, voice, pictures, or any other type of media. In this latter example, in which communications are provided through a web page that a survivor can view, the decedent who sets up an account at the website can optionally receive a decedent-specific web address (uniform resource locator, URL). The decedent-specific web address can direct to a website that can maintain/provide a live connection to prerecorded and categorized communications/responses, predefined by the decedent, for ongoing use by the prescribed survivor(s).

In some embodiments, an individual who wishes to establish an account during his/her lifetime is able to create the account for free, or for a fee, with a website providing functionality described herein. The website can provide an individual-specific page/site—one that is personalized for that individual (account owner) and optionally made accessible only to the individual (account owner) and a set of other persons (i.e. survivors) specified by the individual setting up the account. Upon death of that individual, aspects of that website (decedent's page) can be made accessible to the survivor(s). In some embodiments, the page is made accessible for a specific period of time, such as 15 days, during which time a survivor may view and/or receive communications as described herein, such as texts and/or email responses, from the decedent's website. In some embodiments, a survivor may be notified as to how many pieces of predefined communications, such as predefined texts and other communications, are maintained on the website and set up by the decedent as candidate communications to be sent to the survivor. The survivor may then have the option to continue use of the services (i.e. access to the decedent's page and/or receipt of predefined communications) for a recurring cost, such as a recurring monthly charge of, for instance, $8.00 to $10.00 per month, as an example.

An individual may set up a limited number (such as 200) or unlimited number (or quantity, in terms of storage space) of predefined communications, such as prerecorded responses, messages, thoughts, anecdotes, etc., in voice, text, email and/or video format, as examples, during the remaining portion of the individual's life. Upon the death of the individual, that individual's survivors can be given access (i.e. view, browse, or receive summary information about) to those messages without charge. In some examples, the access is limited to a predefined duration of time, such as 15 days. Some of the survivors may wish to continue access to the service, thereby extending the life of the decedent's page, and pay a monthly charge (in one example) to continue to access those messages for months, years, or any indefinite amount of time. In this manner, several generations of individuals may wish to maintain access to websites for their grandparents, great aunts, cousins, etc.

The free use (or small fee for setting up the initial page) of the website and a mobile application by the decedent while alive, and by survivors for a set amount of time (such as 15 days after death), may be made contingent upon display of advertising at the site. Advertisers may wish to support facilities described herein. Examples of such advertisers might be, as examples, investment companies, family ancestry websites, such as Ancestry.com, funeral homes, floral providers such as FTD or flowers.com, attorneys, web service providers such as Google, telecommunications companies, such as Verizon, mobile phone carriers, search engines, and countless other e-commerce business and websites, though many other outfits may wish to advertise as part of the facilities described herein.

A detailed hypothetical example is now provided to highlight just some of the aspects described herein. Particular examples are provided, though these should not be deemed limiting on the scope of what is described herein, and are provided merely for purposes of example. It should be understood that many other possibilities exist.

In this example, Decedent has a son, F, and two daughters, J and K. F has a son C. Decedent sets up an account at a website providing facilities described herein. Decedent reflects back on some of the memorable times he shared with his family over the years. Based on this, Decedent comes up with, and provides to the website, messages encompassing words of encouragement, words of pride, love, mourning, lecturing, and so on. The website allows Decedent to input this content in various forms including text messages, recorded video content, recorded audio content, pictures, and other forms. Decedent is also able choose the modes of communication through which these messages will be later delivered. In some examples, messages may be provided as, or via, one or more of email, text, voice recordings, video recordings, or even holographic appearances, as examples. Decedent may be prompted by the website to indicate whether he would like survivors to be able to access the website to view these messages, and/or receive emails, texts, or communications via one or more mobile applications.

In this example, the website prompts Decedent to sit in front of his laptop camera and provide 20 second words of encouragement, statements about family history, his late wife, the pride he has in his family, and so on, while those communications are captured as audio, video, text, or any combination of the foregoing. In one example, the website includes features to facilitate the capture, transmission/upload, and storage of this content.

The content (recordings, messages, etc., and/or segments thereof) may then be categorized in one or several of various ways. In some examples, the content may be categorized in different folders, each corresponding to, for instance, a respective survivor that Decedent specifies and lists on the website. In this example, Decedent defines categories of "Birthday—J", "Birthday—C", "Birthday—K", "Hard work", "When you are discouraged", "Love for K", "Love for F", and "I miss you". In this manner, categories may be associated with a particular person and/or topic, such as a category pertaining to J's birthday, or a category pertaining to Words of Encouragement. These categories are provided merely by example; an account owner can use any other categories that he/she desires.

The categories may then be used in the compilation of content (such as emails, text messages, and other predefined (by Decedent) communications) that are likewise stored into the different folders, for instance into a respective folder for each of the children, grandkids, and/or into generic folders that correspond to the Decedent himself, such as "My birthday", "Christmas response", "Easter", "Our Anniversary", "Remember When", and so on. In one example, suggested or recommended categories and/or messages are presented to the Decedent to stimulate ideas about different kinds of messages he/she may wish to predefine (create, modify, upload, select, specify, etc.).

The Decedent may spend some initial time recording/supplying predefined communications at account setup. The Decedent may subsequently revisit the website to predefine additional communications (such as additional text messages, perhaps under different categories, and/or new video responses and emails).

FIG. 1 illustrates an account setup and initial definition of communications, in accordance with aspects described herein. Decedent initiates account setup by visiting the website and signing up for an account with the service (100). Decedent supplies personal information which is saved as account settings (102). Such settings include, in this example, date of birth, social security number, password, password hint (such as mother's maiden name), and payment information (such as credit card information). In one example, the password hint indicates something that survivor(s) of the decedent would be able to answer, in order to enable them to access the account should Decedent be unavailable. In one example, the password is printed and kept safe, for instance in a safe deposit box, with an attorney, or in an email account of a user.

Decedent also builds a survivors contact list containing names of users (104). These can correspond to the other individuals whom Decedent wishes to have access and/or receive at least some of the communications that he predefines, after Decedent is deceased. For each user name, Decedent can specify information about that user/survivor, for instance the user's name, email address, phone numbers (including text messaging number), voice number, etc.

Decedent can also predefine communications/messages (106). By predefined is meant typed, entered, selected, recorded, uploaded, or any other form of provision of communication/message to the system, which then stores the communication as a predefined communication. Thus, Decedent can type one or more messages (such as words of encouragement), and record voice and/or audio data, as examples, and upload this to the website.

In predefining the communications, as one example, Decedent specifies, for each user name/contact (106A, corresponding to Son F), one or more categories (106b), such as Proud, Birthday, Christmas, Mom, Good Father, Family, Fishing, and General Intro to F, in this example. Within each category, Decedent can specify (type, enter, select from a list, record, upload, etc.) one or more emails, text, images, voice or video messages within the category associated with that contact. In FIG. 1, Decedent specifies, within the Work category (106b) associated with the Son F contact (106a), email(s) (106c), and text messages, for instance a text message 106d that reads "F, when all else fails, go fishing. Love you son.". Decedent can also record voice message(s), for instance voice message 106e that recites, "F, stick with your job. Despite what you think you are doing great. Love ya, Dad.", and record video(s) (106f). By the categorization of this content, the predefined communications (including text 106d and the voice message 106e) are categorized as "Work" and this "Work" category specifies messages for F.

This process is repeated by Decedent for possibly many different users (contacts), wherein each user is associated with one or more categories (which may be the same or different as categories associated with other contacts), and one or more messages, of possibly varying types, are predefined by Decedent. In some examples, the same message is associated with more than one person, enabling Decedent to re-use messages for multiple individuals. In this manner, Decedent may record one voice message that recites "Happy birthday, Love you." and associate that voice message with different contacts, such that it may be provided in communications, perhaps at varying times, to the different contacts. In one example, the messages for a particular user are put into a folder corresponding to that user. Additionally or alternatively, Decedent may set up a General Message box having messages that are accessible to anyone with access to messages of his account, or for provision to anyone in his contacts list.

Decedent can also specify hierarchical relationships (108) between, for instance, family members or other individuals, such as friends, as part of a 'family/friends tree'.

Figure 2:
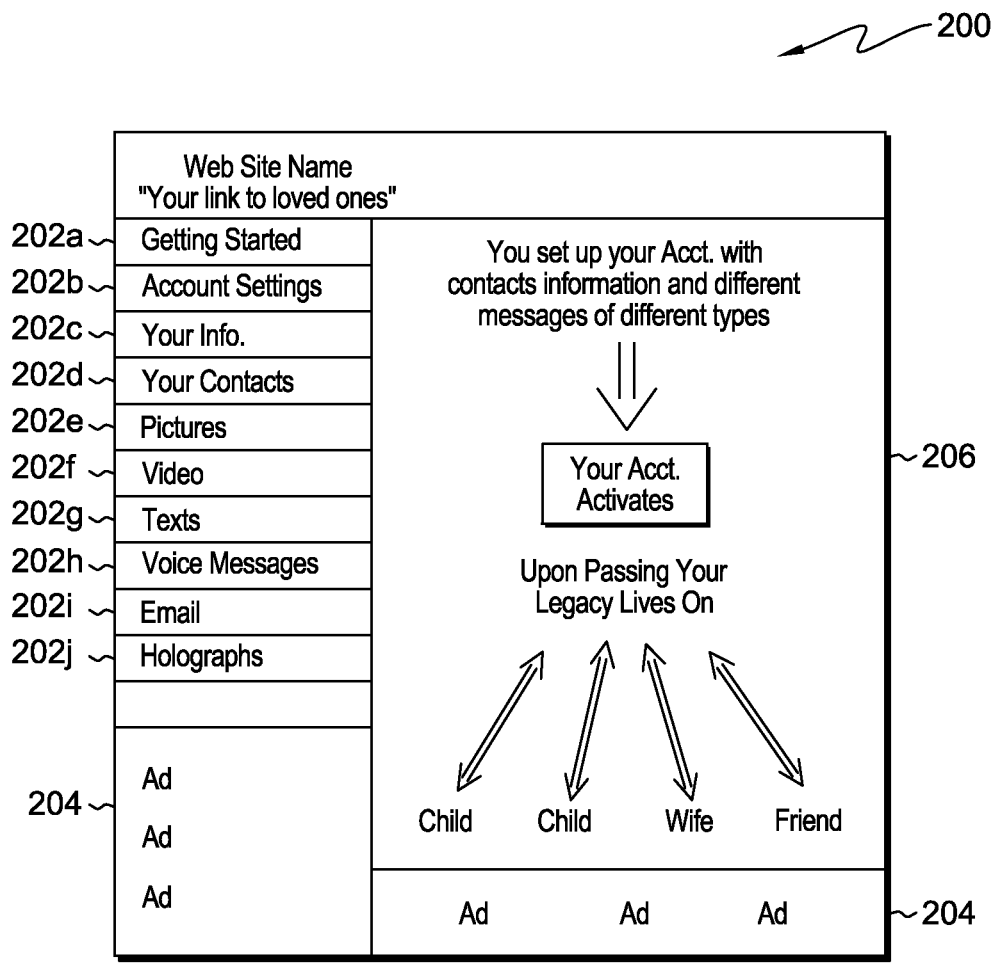
FIG. 2 illustrates an example layout of a webpage presented to a user when logged into the user's account, in accordance with aspect described herein.

FIG. 2 provides an example layout of the webpage 200 when a decedent logs into his account. Along the left side, there are buttons/links (202) to other pages/modules where Decedent can specify different types of information. These other pages include: Getting Started (which provides tutorials, FAQs, or other help information), Account Settings (where Decedent can adjust account settings), Your Info (where Decedent can specify personal information), Your Contacts (where Decedent can add, modify, or delete contacts, and associate them with messages and/or categories), Pictures (where Decedent can view, edit, and upload images for use in messages to be sent after he is deceased), Video (where Decedent can view, edit, and upload videos for use in messages to be sent after he is deceased), Texts (where Decedent can view, edit, and specify texts for use in messages to be sent after he is deceased), Voice Messages (where Decedent can view, edit, and upload voice messages for use in messages to be sent after he is deceased), Email (where Decedent can view, edit, and specify messages for use in email messages to be sent after he is deceased) and Holographs (where Decedent can view, edit, and upload holographs for use in messages to be sent after he is deceased). Additionally, adspace 204 is provided for advertisements to be displayed.

Further, a guidance area 206 is provided guiding Decedent on the general workflow of facilities provided herein, e.g., Decedent sets up his account with contacts' information as well as different messages of differing types, Decedents account activates (explained below), and upon passing, the Decedent's legacy lives on through messages to children, wife, and friend(s), in this example.

Returning to the example above, in late 2013, Decedent collapses, succumbs to his health condition, and is laid to rest. Sometime (for instance three days) after Decedent's death, F, K, and J each receive a card from the funeral director or the family attorney, or a text or email from the website, directing them to visit the website at which Decedent set up the predefined communications. The card may include a password and user id already set up for the recipient (F, K and J). Since Decedent supplied to the website the contact information (for instance text/cell numbers and email address) for each recipient before he died, this contact information is already known to the website. The website is familiar with those individuals, in that Decedent preconfigured them as contacts associated with his account.

When F, J, and K visit the website, they can log in with the supplied password and create their own profile to authenticate their continued use of the service. They may be given options to either listen to all messages (with which they were associated by Decedent during the categorization of the messages) at once or keep the messages categorized in folders and only access them when the need arises. In this regard, Decedent may have indicated which communications predefined by him are to be made immediately accessible to the survivors, and which are not. In some examples, no predefined communications are accessible to a survivor who logs in. In some examples, a survivor is able to see how many predefined communications meant for that survivor exist, for instance in each category or overall, but is not yet able to view, listen to, watch, etc. those predefined communications.

Figure 3:
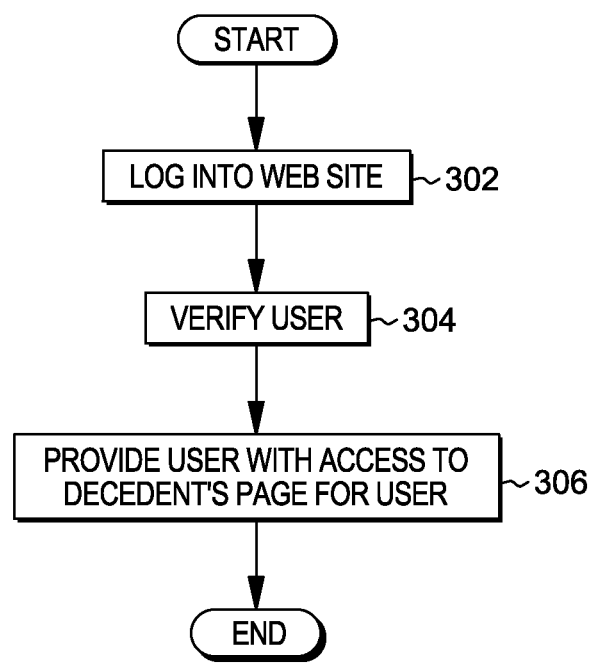
FIG. 3 depicts one example of a process performed when a survivor logs into a webpage associated with an account of a user, in accordance with aspects described herein.

FIG. 3 depicts one example of a process performed when a survivor logs into a webpage associated with an account of a Decedent, in accordance with aspects described herein. Referring to FIG. 3, F visits the website and logs in (302) by, in this example, providing his father's user name, date of birth, and the password that F received. Next, F is prompted to verify his user information, such as his name, cell phone number and email address. F provides this information, and that information is compared to the information previously provided by Decedent and stored on file, to authenticate F with the system (304).

F, being verified, is given access to Decedent's specific page for F (306). The page may include a General Opening Introduction including voice, pictures, and video that were predefined by Decedent. For instance, one of the General Opening Introduction messages reads "F, I hope you enjoy this folder and messages. I miss you and will always be here for you. Dad." In addition, one or more communications for automated provision to F may be presented. These may include, in this example, text messages, emails, voice messages, and holographs. In one embodiment, F is given the option of reading some or all of the automated communications, or leaving them unopened/unread and meant for automatic communication at some time in the future (and perhaps in response to a communication from F to the system). In one particular embodiment, Decedent is able to specify whether any particular message is to be locked from view by the individual and provided later when some condition is met, such as lapse of a particular amount of time, or upon the next occurrence of a holiday, as examples.

J completes a similar procedure as F does above but may decide to access all messages in her folder and the general message box. She laughs and cries at many of the messages, smiling at what a great memory her father had to remember all of these events in their lives. She does not tell the others what those messages say. She decides to keep the messages there and access individual ones again in the future.

Continuing with the above example, assume F has a busy day at work and, in frustration, uses his cell phone to text his father, Decedent, "not sure how you did it Dad . . . this place is falling apart". Subsequently, F receives a response text from his father's account: "F, go in the back storage room and look behind the box of cups. There is a bottle of Scotch. That's how I did it. I love you and am proud of you". F sends a message back "Love you and miss you Dad." Another response text replies to F with "Love you too son and your Mom sends her regards. Keep smiling".

In this manner, F can text the system, which may utilize Decedent's old text number (assuming it is ported to the service) to thus give a greater impression to F that he is texting with his father, and receive responses from the system. The responses are predefined by Decedent at the website before his death. The recognition of the subject matter of F's texts and the ability to select the correct response is provided, in one example, by back-end (of the website) software, Decedent's own manual selection of how the text should be categorized, a combination of the two, or any other appropriate method. These responses could have been placed in the folder for user name "F", subcategory "Problem at Work". The other responses could be categorized as "F Love you" or "F Proud of you". The system can pick up on keywords in the messages from F to decipher the subject matter of the received text. The system can then select an appropriate predefined communication defined by Decedent and respond with that selected communication.

Figure 4:
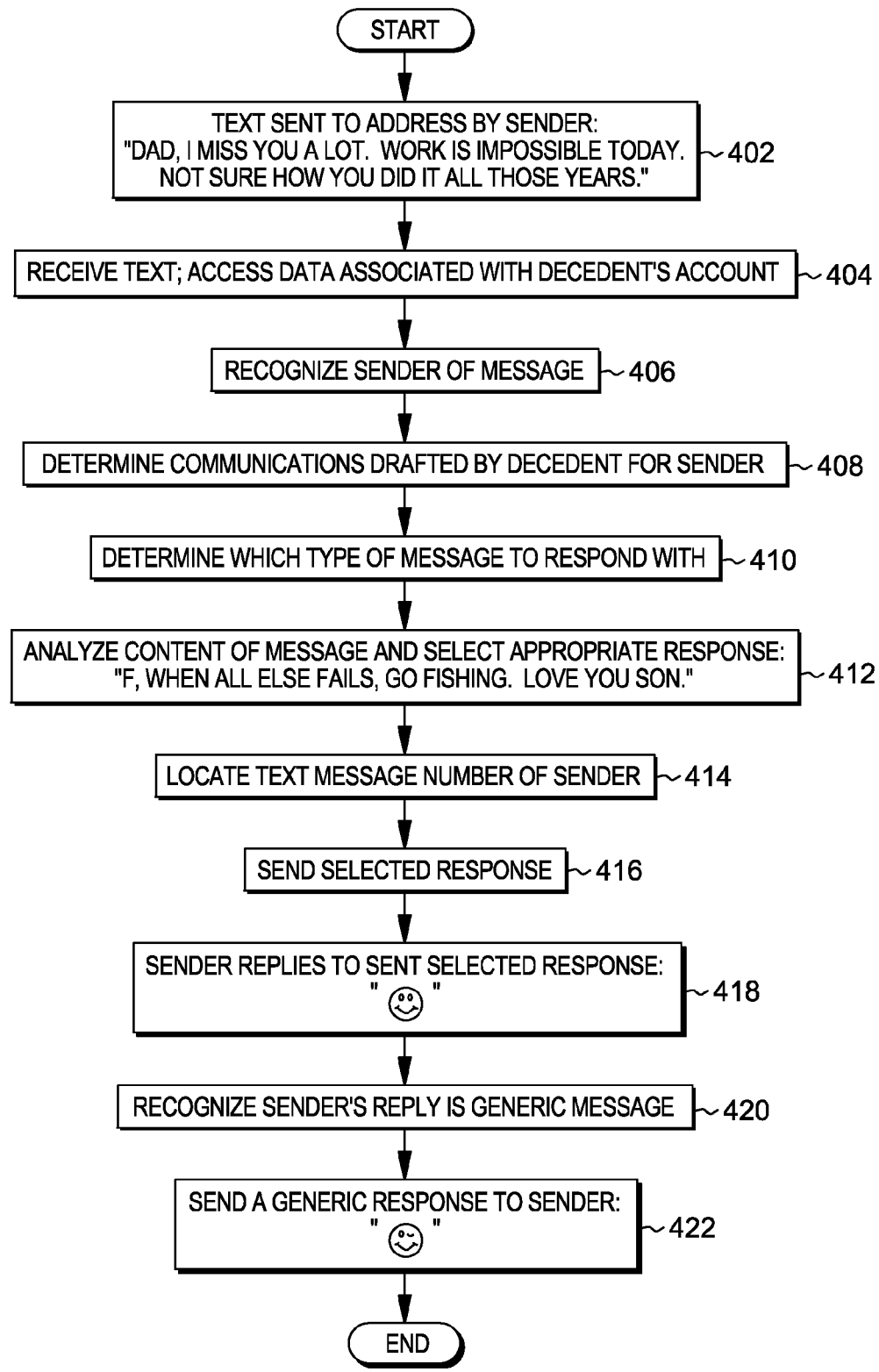
FIG. 4 depicts an example of automated communication and selection of responses, in accordance with aspects described herein.

By way of another specific example, refer to FIG. 4, which depicts an example of automated communication selection of responses. Using the example above where F has problems at work, he sends a text to a specific website address (402), which is specific to F. If the service is provided at xyz.com, then the website address for F might be F.Decedent.xyz.com, as an example. In this example the texts are directed to a domain, but in others they may be directed to a telephone number, such as one previously assigned to decedent but ported to a facility described herein.

In FIG. 4, F texts, "Dad. I miss you a lot. Work is impossible today. Not sure how you did it all those years." (402). The text is received by a server, which accesses the data associated with Decedent's account (404). It recognizes that this is a message from F (406). It then determines communications defined (by Decedent) for F (408). It recognizes that a text message was received from F and determines to respond by also using a text message (410). It therefore determines the text-based automated communications for F. The server can analyze (e.g. parse in this example) the message received from F and identify the key words of "miss you" and "work". The server can then determine an appropriate response (412). Any methodology can be used to determine the appropriate response, e.g. when multiple appropriate responses are available. They could be selected in a round-robin fashion in one example from the Work category (in this example). In another example, their relevance can be ranked based on the keywords identified. In this example, the response "F, when all else fails, go fishing. Love you son." is selected. The server then, in this example, locates F's text message number in the user information for F (414) (though in other examples, could simply reply back to the number from which the text message was received). It sends the selected response (416). In this example, F replies to the response with a smiley face (418). The server can then recognize this as a more generic message (420) and reply with a more generic message (i.e. without digging into the categories of messages for F) (422). In the example of FIG. 4, the more generic message is a winking smiley face.

J and K can likewise engage in similar exchanges with the system. Thus, they can text their father "Happy Birthday". The system, recognizing the words used in the message, and perhaps also based on the when the message received (e.g. on or around Decedent's birthday), can reply with a message that Decedent predefined and associated with his birthday, such as "Thanks, I feel every bit of it, but loving my time here with Mom", or similar.

The kids (F, J and K) may decide to pay additional fees to keep the website running for years to come as they look forward to Decedent's emails, texts, and watching his video messages. C (F's grandson) may see how much his father (F) and aunts (J and K) enjoy the application and responses that C encourages his dad and his aunts to also sign up. They may create a page (which in some embodiments is associated with the user account they used to access Decedent's messages for them) and begin entering information. In some examples, the pages that descendants (F, J and K) create may have significantly more information than Decedent's, though they may continue to access Decedent's page from time to time when they wish to experience a connection with their father.

An example is now provided that outlines a process (method) as described herein. It should be appreciated that, in some embodiments, one or more of the steps may be omitted, modified, or arranged in a different order, or that intervening steps not specifically presented in this example may be added.

Step 1: Initially, an individual (who will eventually become the decedent, and is referred to as "individual", "decedent" or "account owner" in this example) visits the website and enters account information (name, address, employment history, DOB, SS# (optional), mother's maiden name, phone number, email address) for security and background purposes.

Step 2: Next, the account owner enters names of "contacts" including loved ones, family, friends, relatives, etc., along with the email addresses, cell phone numbers, text numbers, physical addresses and/or other means of communication for future reference and use by the application/server upon the death of the individual.

In some embodiments, after an account owner sets up his account and provides contact information for contacts (i.e. to-be "survivors" of the decedent), an email or other communication may be sent to the contacts (e.g. email addresses thereof) that the decedent indicated. The email or other communication can provide a brief introduction and a message that the account owner (decedent) has created an account at the website, for instance www.latertalk.com, for which the contact has been listed as a child, parent, sibling, friend, etc. The contact may then be invited to visit the website (e.g. www.latertalk.com), confirm his/her relationship to the account owner for authentication purposes, and/or confirm contact details supplied by the account owner (for instance cell phone number, email address, etc. of the contact). The email or other communication may thus prompt the contact to authenticate the contact information for the contact by prompting the contact to 'Please visit www.latertalk.com to authenticate your relationship with the account owner'.

In some examples, the communication sent to the contact also requests that the contact submit any questions that the contact wants the account owner to answer. Once a contact visits the website, he/she could navigate to a specific category/folder, for instance one corresponding to that contact, and be presented with a drop down menu of questions to ask or prompts for response. The contact could additionally or alternatively define his/her own prompts/questions like "Hey Dad. Really miss you, hope everything is alright. Tell me how you're doing?" or "Remember the time when you forgot your tackle box? I think about that." The decedent, when logging in to his/her account after contact(s) have indicated prompts/questions to be answered by the decedent, may then be prompted by the system to respond to these prompts/questions. The decedent may see an indication that there are prompts/questions for which responses need to be created by the decedent. The decedent's responses/answers may be stored for access by, or presentation to, survivors after the decedent passes. For instance the responses/answers may be stored in a private album/category corresponding to the contact who requested that the prompt/question be presented to the decedent for response. The responses/answers may later be used to automatically respond to a survivor who selects the prompt/question.

As another possibility for the authentication communication sent to the contact, a streamlined verification link may be provided where the contact's clicking on the link automatically verifies his/her relationship to the account owner (e.g., verify son's kinship to father, verify friendship, co-worker, etc). This could operate as an automatic verify, where the survivor would click the link and verify relationship without having to log into the site.

Yet another possibility for the authentication procedure is for the contact, once he/she receives the initial verification email when decedent sets up his account, to click the streamlined verification link described above or visit the site and set up his/her own "free" account (or a combination of the two). By the contact setting up his/her own account, it may be considered a verification of the relationship to the decedent based on the contact listing decedent in the contact's new account as the relative, friend, co-worker, etc. of the contact.

Step 3: The account owner selects each name from the contacts list and sets up a classification of subject matter for each contact (examples include: "Miss You", "Work", "Christmas", "Birthday", "Easter", "My Birthday", "Proud of You", "Fishing", "Family Memories", but any other classification scheme can be specified by the individual). The account owner may specify the method(s) of communication for responses, e.g. either as email, text, voice, video, holograph, or some combination thereof, for each of the contacts and subject classifications.

The website may therefore include a platform that categorizes account owner messages into sub-files/directories for specific survivors (children, grandchildren, siblings, parents, friends, etc.). Such content (predefined messages) may be stored in folders, and the account owner may define messages to be put into those folders, which can include defining text or email messages, or uploading other content to those folders (pictures, videos, etc.) as examples. A top-level folder may correspond to one or more survivors.

The account owner can draft messages and file/save these messages under various survivors' albums/binders, which may be organized into sections on graphically-depicted shelves on the website. Each survivor's section (binder) of the shelf may be designated as private or public. A binder in a public section for a survivor may include written messages and memories of the owner and survivor, photos of the owner and survivor, video clips, and important dates that the owner describes/defines. In some embodiments, the ability to download content (text messages, photos, video, etc.) is provided. This ability may be delivered as a premium feature dependent on payment of fees, for instance based on an account owner and/or survivor subscribing to a premium subscription offered by the website.

The account owner may therefore decide which messages are public and viewable by other permitted visitors, which messages are viewable to a designated survivor while the account owner is alive (i.e. prior to the account owner becoming deceased), and/or which messages are to be kept private and only activated for sending upon the passing of the account owner. An account may have a dashboard or main page with some profile and/or public information, and some private information i.e. various public-facing elements and private elements. The page may include elements that are made accessible to the public or specified individuals, for instance those with verified relationships to the decedent, for instance grandchildren. In some embodiments, visitors to the decedent's page can leave a remembrance in a visitor book but will be unable to access the specific messages for specified survivors (e.g. family members or close friends).

Thus, by way of example, the account owner may create a folder for son M, with messages (photos, videos, etc.) for display to son M when M logs in/views a page displaying that folder. Some messages might be publically-accessible, some might be viewable only to M, and some might be hidden from M until some later time. For instance, some might be hidden from view by M but automatically sent to M upon a triggering event being satisfied, for instance occurrence of a holiday, as described further herein.

Step 4: Next, the account owner may setup one or more general greetings to visitors, optionally as video, voice, narrative, family tree, pictures, etc. In one example, this section does not rely on communication from users or text/email. It may be used as the general purpose page (profile page described above) with information regarding the individual, memories, important dates, etc.

The account owner may pay a fee, perhaps that is recurring, for storage of data in databases associated with the webpage. In one example, fees are charged based on the amount of data being consumed and/or whether the individual has consumed beyond a certain data storage limit (number of texts, emails, photo and video storage limits to be preset).

Step 5: The individual can print out a card having multiple sections, with each section including login information, a password, hint, date of birth, and/or other information. A section may be given to an attorney (such as the attorney involved in creation and or probate of the Will of the decedent), one section to the anticipated funeral director, and one section to either the executor(s) of the Will or to be stored in a secure place, such as a safe deposit box or other secure location.

Step 6: The account owner may revisit the website from time to time to add additional data, texts, emails, attach pictures, etc., for instance for specific events like Birthdays, Anniversaries, Christmas.

Step 7: Upon the death of the individual (decedent), the website can, for instance, keep track of the decedent's social security number to trigger automatic sending of an announcement to family contacts (who are authorized contacts created by the individual) by way of email or text, as example, prompting them to visit the website. The announcement is, in one example, sent from a conspicuous account address, such as decedent@website.com to identify that the message is from a reputable source. In the alternative, as noted above, a lawyer, funeral director, or family member may have the login information on the printed forms (described above) left by the account owner, in order to identify the website for survivor access.

Determination and notification of death can be handled in different ways. In one example death records and/or similar publically available information may be monitored in order to automatically identify when an account owner has deceased.

In other examples, multiple individuals may be required to verify death in order to activate the (deceased) account owner's account for sending/providing, or otherwise making accessible, predefined messages defined by the decedent during his/her lifetime. In cases where next of kin are required to notify/verify that an account owner has deceased, and if there is only one next of kin, then that next of kin may be the sole responsible party to verify death of the account owner. In examples where multiple next of kin exist, verification of death of the account owner, and therefore activating the account for provision of predefined messages, can be made contingent on verification by some number of the multiple next of kin, which may be the entire group of kin or may be a subset of the group.

In some examples, the individuals to be responsible for activating an account owner's account may be defined by the account owner during his/her lifetime. An account owner may in this manner designate one or more agents ("activation agents") who are responsible for notifying/verifying the website of the death of the account owner. Disclosure may be provided to the account owner during his/her lifetime that the account owner acknowledges that he/she is enlisting the services of the agent(s) to activate his/her account for provision of the messages he/she predefines.

Additionally or alternatively, to help prevent activation agents from activating the account owner's account prematurely (while the account owner is alive), the verification of death by activation agent(s) (such as a child) may be dependent on the account owner's lack of response to a communication provided to the account owner informing him/her that he/she has been indicated as deceased. A lapse of a period of time after sending the communication, and during which the account owner can reply, may be taken as an indication the account owner is actually deceased, as is described in further detail below.

Further, notification of death to the website may be effected by a survivor visiting the website and submitting a notification thereto, whereupon an auto-generated email may be sent to those contacts (email addresses or cell numbers for instance) listed by the account owner as being activation agents, as is also described in further detail below. The email may prompt the recipients thereof to verify death of the account owner. The recipient may be prompted to click a link within the email to verify this. Additionally or alternatively, the recipient may be required to send or link to a published obituary for the account owner, which may be analyzed automatically by a computer or by a human to determine whether the obituary is legitimate and therefore help determine the validity of the claim that the account owner is deceased.

In some examples, a minimum number of activation agents are required to indicate that the account owner has died. The minimum number may be, for instance, two, or may be based on the number of activation agents defined by the account owner (for instance when half of the activation agents confirm death, then the account is activated). The activation agents therefore may collectively confirm death of the account owner, and the account may be activated for sending of predefined communications (assuming that the owner does not respond to a communication informing him/her that he/she has been indicated as being deceased by his/her activation agents).

As part of the activation of the account owner's account or thereafter, family members or other survivors, if they were set up by the decedent with the system, can log into the website and verify their identity against the information provided by the decedent. Once verified, the survivor may be given access to a general introductory greeting, photos and/or video, as well as prewritten texts, emails, voicemails, videos and holographs for that individual survivor. In some examples, these communications are available for a set period of time, such as 10 or 15 days. In some cases, if the survivor(s) wish to view, save, and access the texts, emails, voicemails, videos, etc. beyond that time period, a monthly access fee can apply.

Communication and interaction with the account owner's website page(s) can be important to the operation and uniqueness of the service provided. A survivor may see that the decedent arranged for, for instance, over 200 simple texts in the decedent's folder to be provided the survivor and over 100 emails and voicemails to be provided to that survivor. To maintain a unique relationship and contact with the decedent over a period of time, the survivor may wish to not read/view/hear all of the predefined communications initially, instead saving them for receipt as texts, emails, calls, etc. later on.

Once the account of an account owner is activated for provision of the predefined messages to survivors, the messages may be individually triggered for provision to survivors. To facilitate this, in some embodiments, communication facilities of the account owner (email address, cell phone number, etc.) may be taken-over and/or used in the provision of these messages to the survivors. For instance, the account owner's telephone number(s) could be ported to the control of facilities described herein, in order to allow those facilities to send predefined messages from the telephone number of the decedent, and receive communications sent to the decedent's telephone number (and possibly automatically respond to those communications with predefined messages, as described below). In other examples, email account login credentials or SMTP/POP server credentials for the account owner's email account are provided to facilities described herein to enable predefined communications to be sent via the decedent's email address to survivors, and/or to allow incoming emails sent to the decedent's email address to be received and responded to by the facilities described herein.

In further examples to facilitate receiving communications from survivors directed to the decedent and/or sending of predefined messages as coming from the decedent's identity, one or more new identities (email addresses, telephone numbers, text handles, etc.) can be created that correspond to the decedent's account. A respective unique new address may be created for each survivor to use in communication with the account owner's account, such that messages sent to and received by that unique new address are regarded as coming from that survivor, and messages to be provided to the survivor are sent from that unique new identity. In other examples, multiple survivors use a single unique identity to communicate with the account owner's account, and facilities described herein ascertain, based on the sender's email address or other communication header information, for instance, from which specific survivor the communication is received.

In providing messages to survivors, the system may perform automated translation of the messages. The translation may occur at any point, for instance when the decedent provides the content of the message to the system, or just prior to providing the message to the survivor. Text or email messages, for instance, may be translated into a message in a language specified by a user. Audio as part of a discrete audio file or as part of a video with an audio stream could be overdubbed in the language of the recipient, or translated and transcribed into text and provided to the recipient, as examples.

Any user, such as the decedent or the survivor, may indicate that a message should be translated, and the language into which it should be translated. In this regard, if an account owner defines a message to be provided to a relative whose native language differs from that of the account owner, the account owner could indicate to the system that the message is to be translated into that native language for provision to the relative. Alternatively, the relative could indicate to the system that the message (or any messages in general sent by the system to the relative) should be translated prior to provision thereof to the relative.

Further details are now provided regarding provision of predefined communications to survivors. In one mode, communications are "pulled" by survivors, in which, as noted above, communications are provided for display to survivors when they login and view messages/pages that the account owner has setup for display of those communications. Some content might be publicly accessible, some might be made available after a lapse of some time period, only to a given survivor who logs in, and some may be reserved for spontaneous sending to the survivor. In this pull method, a survivor logs in and views a corresponding category of predefined communications. The category may include messages predefined by the decedent and meant for provision to the survivor upon login. Other communications may be responses by the decedent to questions previously posed by that survivor. When logged in, the survivor might 'pull' such a predefined response by selecting the question that was posed to the decedent and being presented with the response. In some embodiments, a mobile application ("app") is provided for users to login/view content at the website. In these scenarios, a survivor may use the app to access a drop-down list of questions/prompts that have been responded-to by the decedent, and, based on selection of an item within that list by the survivor, the decedent's predefined response is provided to that survivor. The survivor may also use the app to view messages in the public folder corresponding to that survivor (the folder set up by the account owner and viewable only by the survivor). In cases where the predefined communications include media such as pictures, videos, or audio, the app can present to the survivor this content as well.

In another mode, communications are "pushed" to survivors. Messages may be setup to be pushed automatically to survivors based on triggering events. These messages are spontaneous in that they are not necessarily provided in response to any survivor action. In some examples, these messages are automatically sent on dates specified by the account owner, or sent based on triggering events ascertained automatically by the system based on, for instance, current date/time, important events such as holidays or anniversaries, seasons, time of year, etc.

The webpage and web-based applications described herein can also be set up to place automated calls, texts, emails or other communications to survivors on pre-specified dates such as their birthdays, or anniversaries. For instance, voicemails could be sent automatically on each birthday based on the account owner setting up voicemail recording for the $31^{st}$, $32^{nd}$, $33^{rd}$, $34^{th}$, etc birthdays of children, parents, etc.

Thus, messages can be scheduled for sending on based on satisfaction of various triggering events, such as a current date being a holiday, event, birthday, anniversary, and so on. In these cases, a triggering event for sending of these communications is occurrence of the particular date, holiday, etc. as the case may be. The account owner can specify certain dates in the future to send an auto message. This can be setup for a recurring basis, such as 'Christmas for years 2020-2050'. The account owner can specify which survivors to which a Christmas message should be sent on any given year. In some examples, the account owner specifies multiple different generations of survivors, with automated sending of messages to each generation being staggered with respect to the others, thereby capturing survivors such as children, grandchildren, and great grandchildren who may not yet be born but whose contact information may be later defined to the system.

The account owner can draft different messages for each year, use the same message from year to year, or draft multiple messages tagging them all as 'Christmas' and having the system choose which to send, with the ability to deliver a different message each year thereafter.

In some embodiments, messages are associated by the account owner with a survivor's miscellaneous folder, and delivery of the messages therein occur on various dates throughout the year. In some examples, the messages are spontaneously provided. In some examples, the message(s) are selected for provision by the software within parameters set by the owner, such as a season of the year (Spring, Summer, Football season, Fishing season, etc.), thereby providing a more unique and real life communication without requiring the account owner to specify an exact date on which the message is to be provided.

In examples in which an account owner has setup responses to questions/prompts, the system can automatically provide the response (optionally with the prompt provided, for context), randomly.

In cases where multiple messages have been categorized into a bucket of similar messages to provide to a survivor on a given occasion (for instance fifteen different Happy Birthday messages for a survivor have been setup by the account owner), the system, when triggered on a given occasion, such as the birthday, can select which message of those fifteen to provide to the survivor. Any selection scheme can be used. The selection could be pure random, or could be weighted-random, in which messages that have been most recently sent to the survivor are least likely to be selected, while the least recently selected messages are most likely to be selected for provision to the survivor. In other examples, the selection follows in a round robin fashion.

In yet another mode of communication, combination "push-pull" mode is used. This is a special case where the triggering event for sending of a predefined communication is receipt of a communication from one of the survivors. In some cases, the received message is parsed automatically for keywords, concepts, topics, etc. and an appropriate response is selected automatically and provided back to the survivor. To illustrate, a surviving daughter may text the deceased account owner's account, "Happy Birthday Mom—I love you". A text response may be provided by the system in response. The system can analyze the message from the daughter, access the collection (e.g. folder) of messages setup for provision to that daughter, locate a birthday-related message collection, and reply with "Thank you honey, I love and miss you too". The daughter may text back ""☺"" and system may analyze that message and reply accordingly with ";)".

Emails, which are typically longer than texts, can be returned with appropriate-length responses, such: "Mom—just wanted you to know how much I respected your work as a teacher and all the time you gave me during my education to help me. College was so difficult and I truly appreciate everything you did for me." The decedent could setup a prearranged email which says "Son—your work in college was the highlight of my life as a parent. You worked so hard and I am so proud of what you have accomplished", as an example.

In other embodiments of the push-pull mode, as described above, predefined answers to prompts, such as questions, may be provided. One or more unique responses can be created by the account owner. When the system receives a communication from a survivor, the system can respond by sending one of the responses. Communication in this sense could be the content of the prompt itself—for instance the survivor could ask the question in a communication directed to the decedent. In other examples, the communication includes an indication of the prompt but not the content of the prompt itself. For instance, the survivor may be presented with a selection box to select one of the questions for which answers have been provided by the decedent. The system can recognize that a selection of the $12^{th}$ item in the list represents a given question. If the survivor selects that item in that list, an indication of the $12^{th}$ item (for instance the number 12) can be provided to the system, which correlates that indication to the actual question. If more than one answer has been setup for a given prompt/question, the system can select, using any appropriate selection technique, which one or more to provide in response.

In some examples of the prompt/response mode, prompts for response by the account owner are setup by survivors. Survivors can select or draft specific prompts that the account owner responds to during his/her lifetime and that will later be sent to survivors.

In contrast to a survivor submitting prompts, the owner could submit prompts that he/she then responds to. In other words, the owner might submit a question, optionally associating it with one or more particular survivors. A question defined by the decedent and associated with the decedent's son might be "Hey dad how are things going?". The account owner would then provide answers to that question, and later the son could be presented with the choice to select that question and receive the response from his deceased father. In this manner, prompts may be defined (and answered) by the account owner rather than a survivor.

In some cases, an account owner creates multiple responses to a single prompt posed by the survivor (or by the account owner). For instance, if one prompt responded to by the decedent is "I miss you Dad", the owner could define any number of responses to that prompt, perhaps tens or even hundreds. When the survivor-son selects the prompt from an interface (such as a mobile application interface) or types the prompt into a text or email message and sends to his father's account, the message could be handled by referencing (on the basis of the sender-son's identity) the category of messages setup for the son. Some of the owner's responses could be, as examples: "I miss you too Joe. Very proud of you", "You were always there for me and I couldn't be happier with how you turned out as a fine young man", "I know I will see you in the future but for now always know that I am proud of you", "Mom and I miss you too and we watch over you and the kids. We love you", and "I miss you too . . . especially our times together fishing and playing baseball together". When survivor-son's message "I miss you Dad" is received by the system, software can determine from the message content the exact prompt to answer, and therefore the collection of messages to access for the reply. The system can select, randomly in some cases, one of the multiple responses to respond with via, e.g., text or email.

The more responses the owner has drafted in his account, the more this allows the survivor to engage in a unique and personal daily, weekly, monthly or annual electronic conversation with the loved one who has passed. This same concept can be used for other preset (standard) prompts that the survivor can choose to send to the decedent (questions that the owner highlighted and responded-to when setting up his/her account). Other prompts an owner might draft and present for his survivors to access and send post-death could be "I hope you are enjoying your Holiday Dad", "Happy Birthday Dad", or "I'm having a tough day at work Dad . . . sure could use your guidance". Any countless number of prompts that the owner might anticipate the survivor might ask could be proactively responded to by the account owner. For each such prompt, the owner can leave multiple responses that are then selected randomly as responses to survivors' selection of that prompt, thus lending authenticity and spontaneity to the conversation between the survivor and the loved one.

Aspects described herein may be provided as part of subscription to access/use various facilities of the website and/or systems for providing predefined communications to survivors. At a free tier, the account owner may be afforded some number (such as five) free questions/answers/texts per survivor. Additionally or alternatively, the type of media may be limited. In one example, the account owner is enabled to attach/predefine images for provision to survivors but not audio or video. The free tier might additionally or alternatively be advertisement supported, or particular features described herein may be enabled for an account owner at the free tier based on agreement of the account owner to be presented with advertisements periodically or continually.

One or more pay/premium tiers may be provided that enable varying degrees of additional functionality based on payment of onetime or recurring fees.

In some examples, the account owner is given the opportunity to operate his/her account at either a free tier or a premium tier, but when he/she deceases, survivors must create their own free or premium tier account in order to receive predefined communications. In some examples, the survivor(s) may be required to pay a maintenance fee for the system to maintain the decedent's account and information indefinitely. A discount for the owner account to remain active may be offered to the survivor(s) in exchange for their agreement to setup or maintain a free or premium account. Discounts can also be offered depending on the tier at which a survivor signs up, the number of participating survivors, pre-payment by the account owner to maintain the account after his/her death, etc. Many other payment schemes are possible.

The website page for the decedent (including all pictures, videos, texts, voice, holographs and other forms of communication) can stay in storage and exist for as long as a survivor wishes to pay the periodic access charge. In some embodiments, the accessibility of the webpage for a survivor is not dependent on whether other survivors renew the service. For instance, a son may wish to renew his access to the messages left by the decedent for him, while the daughter may wish not to renew her access to the messages left for her.

In one example, upon lapse of a time period (such as 12 months) of no activity and no renewal fees paid, the data associated with a decedent's account could be purged from the system to free resources. In some situations, however, a family member may want to retain the page and/or the data stored. In this regard, the website could offer a onetime purchase of all data (general data and/or data relating to that one family member) for a fee. The data could then be transferred via download or as a link to the family member's own page on the website. Assuming the family member creates his/her own page on the website, each link of deceased customers could appear on their page and family heritage could be tracked across multiple generations.

Figure 5A:
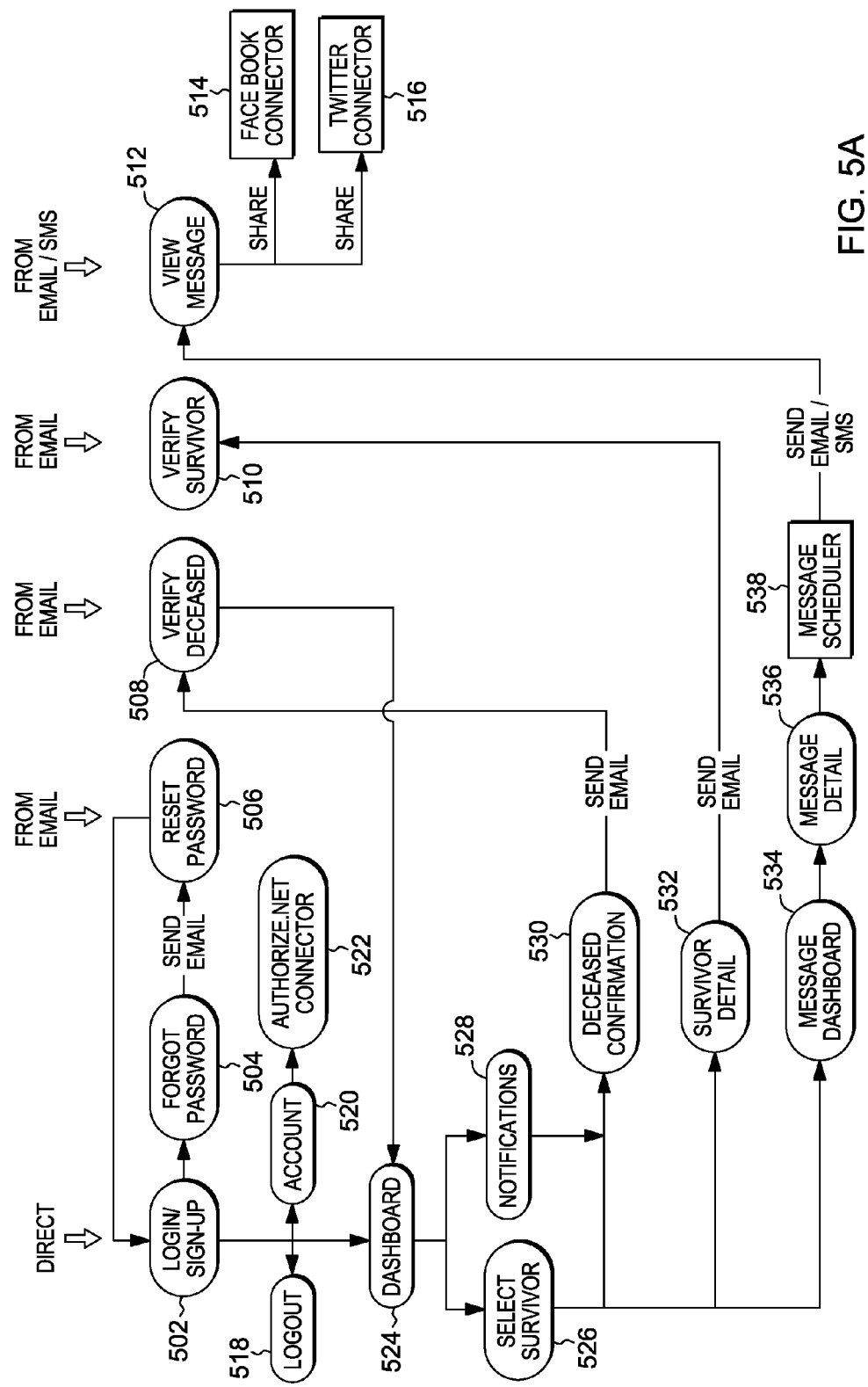
FIG. 5A depicts an example conceptual layout of a web-based facility, in accordance with aspects described herein.

An example conceptual layout for a web-based facility in accordance with aspects described herein is now presented with reference to FIG. 5A.

A user can enter the system by logging in or signing up for an account through a login/signup module (502) by navigating directly to, for instance, a front end website of the web-based facility. The login/signup module (502) can be a dual-purpose webpage allowing the user to login to an existing account, or signup for an account. In one example, a basic form log in (email address and password) is used to create a session and transition the user into deeper aspects of the web-based facility. If the user is signing up for a new account, in some examples, a basic form is provided to enable the user to subscribe for free by providing email address, password and confirmation password, first name, and last names, as examples. The system can then create the session and transition the user into the deeper aspects of the web-based facility.

In some examples, the user enters the system from an email client/reader, and more specifically, can click a link in an email and be directed to a reset password module (506) used to reset the user's password. A form can be presented to the user to reset his/her password (new password and confirm new password), and upon resetting the password, the user may then be directed to the login/signup module (502) to login using that new password.

If the user experiences problems logging in, the user can indicate that he/she has forgotten his/her password by clicking a link, for instance, that causes a forgot password module (504) to initiate sending of an email to reset the user's password. A form can be presented for the user to enter his/her email address to which the reset password email is directed. An email may then be sent with instructions for how the user can reset his/her password. In this case, the user may open the email with a reset password link, click the link, and re-enter the system from email, being directed to the reset password module (506) and proceeding as described above.

At some point after logging in, the user may wish to logout. A logout module (518) is provided to log the user out, which would end the user's session and may transition the user to a login (or re-login) page.

After logging in, the user may be presented with an account module (520). The account module could present form(s) for (i) presenting account profile information for the account owner (first name, last name, email address, contact information such as mobile phone number(s), physical address, etc.), (ii) changing the account password (with password and confirmation), (iii) indicating the subscription tier at which the account sits, subscription tier features, renewal dates, etc., and/or (iv) present billing information (credit card number, expiration date, name on card, CVV number, etc.).

From the account module, the user may access an authorization connector module (522) (an Authorize.net connector module, in this example) to, for instance, (i) create an automated recurring billing (ARB) subscription in order to manage automatic billing aspects that depend on the subscription tier of the owner's account, (ii) update an existing ARB subscription, for instance when payment information, such as credit card information, changes, (iii) cancel an ARB subscription, for instance to discontinue service, and/or (iv) process callback notifications when ARB processes payment (or fails due to an error).

After logging in, the user may be presented a main dashboard (524). The dashboard may present a list of survivors setup by the account owner, together with corresponding survivor information such as the survivor's name, the number of predefined messages the account owner has identified as being for provision to the survivor, as well as an indication of whether that survivor is a activation agent. The user may setup a new survivor or select an existing one. Upon the user selecting an existing survivor (526), a survivor detail module (532) could present more detailed information/functionality with respect to the survivor, including abilities to (i) show more detailed information such as survivor profile information or an indication of whether the survivor has been verified, (ii) edit or manage that survivor information, (iii) delete a survivor and/or predefined messages for provision to the survivor, (iv) send an email to verify, or re-verify, a survivor (510), and/or (v) transition to the message board (534) showing messages to be provided to that survivor, as examples.

If the user currently logged in is a survivor indicated on other owner account(s) (i.e. accounts of other account owners within the system), the dashboard may present the user with a list of those other account owners and other relevant information. This information might include a name of the account owner, message count (number of messages predefined by that account owner for provision to the user), whether the user is an activation agent for that other account owner, and status as to whether the other account owner is deceased or instead is a decedent-to-be, as examples. More detailed information may also be provided, such as profile information for the other account owner, information showing whether the account owner has been indicated as deceased, and, if so, the number of deceased confirmations outstanding (not yet responded-to) for that deceased account owner.

If the user is an activation agent for a survivor, the user may click a button/link (530) to indicate that that account owner is deceased. In one example, the process flow of FIG. 5B, described below, for managing flagging of an account owner as deceased is triggered when the user clicks this button.

The dashboard (524) can also present relevant notifications (528). Various notifications are possible. In one example, an account owner will receive a notification when that account owner has been indicated as being deceased by another user, such as an activation agent. The account owner can click a button/link (530) to initiate the process flow of FIG. 5B for managing flagging of an account owner as deceased. In this regard, the account owner would indicate that he/she is, in fact, not deceased. As described below with reference to FIG. 5B, an email or other communication may be provided to the activation agent(s) who indicated the account owner as being deceased. In cases where the account owner does not respond to a notification (528), the system may infer that the account owner may be deceased, and continue to a next step in authenticating the account owner's passing.

Another type of notification (528) may be a notification to a user that is an activation agent for another account owner. The notification may indicate that the other account owner has been indicated (e.g. by another activation agent) as being deceased. The user may click a button/link (530) to then initiate the process flow of FIG. 5B for managing flagging of an account owner as deceased.

Yet another type of notification may be one that indicates that a survivor has prompted the user to enter a response. The user may respond by clicking a button/link to be directed to the message dashboard (534) for responding to the prompt as described herein.

Based on an account owner selecting a survivor (526), a survivor detail module (532) may present more details of the survivor, as described above. Additionally or alternatively, a message dashboard (534) may be presented. This is just one way the user may encounter the message dashboard. Alternatively, the user may enter the message dashboard by other means, for instance directly from the main dashboard (524) or from other modules, such as the survivor detail module (532) as described above.

The message dashboard (534) may display predefined messages and/or details about predefined messages, depending on who the owners of those messages are. For instance, some messages may be ones that the user has predefined for his/her survivors, optionally categorized into, for instance, a hierarchy, according to topic, intended survivor, or by any other categorization. These messages are those for which the user is the owner. Alternatively, the messages could also include those messages that are predefined and owned by other account owners, and intended to be provided to the user, as a survivor of those other account owners.

In the latter case, the user may be able to view message details and/or the messages themselves for those messages defined by other account owners. The messages or message details may optionally be categorized by which other account of the multiple account owners predefined the message. For other account owners who have already deceased, and therefore whose accounts have been activated for provision of predefined messages, the messages that are already accessible/viewable to the user may be listed/displayed, and a number of messages that are not yet accessible/viewable by the user, but are to be provided at a later date, may be displayed as a teaser to the user. For other account owners who are not yet deceased, a number of messages that are not yet accessible/viewable by the user, but are to be provided at a later date, may be displayed as a teaser to the user. Additionally, since in these cases the other account owner is not yet deceased, the user may be given the option to add, edit, view, or delete messages requested by the user to be responded-to by the other account owner. For instance, the user may add, delete, edit, or view any prompts that the user has posed to the other account owner for response by that account owner.

The message dashboard (524) may be used to predefine further messages for provision to survivor(s). In some cases, these further messages include responses to prompts received from survivors. The message dashboard may therefore list prompts (e.g. questions) received from survivors, as well as any responses to those prompts that the user has predefined. The user can add, edit, or delete responses to the prompts. The responses may be organized and associated with the prompt to which the response pertains.

Additionally, existing messages (including the above responses) already predefined by the user may be listed in the message dashboard. For each message already predefined, the user can edit the message or delete the message. Editing the message may include editing any details associated with the message, such as the message content itself (text, graphics, video, etc.), the intended survivor(s) to receive the message, the schedule time or triggering event upon which the predefined communication is to be provided to the survivor(s), the categorization of the message, or any other message properties.

For a given message, or when a new message is defined, the user can be presented message details (536) for the message. This further message detail may include the form of the message, such as the media type of the message (text, video, graphic, etc.), the mode of providing that message (email, text, telephone, fax, physical mail, etc.), whether it is a response to a prompt, whether it includes a media attachments, any triggering event(s) for providing the message, or any other relevant information about the message. Additionally, the message detail can provide (i) components for content upload and transcoding, if necessary, for instance components to handle video/audio/image upload (scripts, applets, dialogs, etc.) and transcoding and (ii) components for previewing rich media (audio, video, graphics), e.g. uploaded content of the message.

The message detail can also include or link to a message scheduler component (538) for defining triggering events for the message. As described in detail above, many different triggering events are possible for triggering provision of a message to a survivor. Once triggered for provision to a survivor, the message may be provided to the survivor by the appropriate communication mode. An email may be sent by email to the survivor, and a text message may be sent via text to the survivor. Voice messages may be provided using different modes. For instance, a phone call may be placed to the survivor, and the voice message may be played once the survivor answers. Additionally or alternatively, the voice message may be attached to an email and sent to the survivor. Videos and graphics may be texted or emailed (as an attachment). Additionally or alternatively, predefined messages may be fixed in a tangible medium and physically mailed or delivered to a survivor. For instance, a card, letter, note, or similar communication may be created from a text or email message and mailed to the survivor. A video, picture, or audio message may be embodied on a storage medium, such as a CD, DVD, thumb drive, or similar, and mailed to the survivor. Various other possibilities exist for delivering messages.

In the example of FIG. 5A, an email or SMS (one form of text message) is provided to the survivor. The survivor may view the message (512) by way of an email or text message client program. The user may optionally be given the opportunity to share the received message via one or more external services. In this example, the user may share the message with social media platforms including Facebook® (FACEBOOK is a registered trademark of Facebook, Inc., Menlo Park, Calif., USA) and Twitter® (TWITTER is a registered trademark of Twitter, Inc., San Francisco, Calif., USA), using an appropriate connector (514 and 516, respectively). Additionally or alternatively, if the survivor has provided an appropriate level of authorization for the system to automatically provide the message to the survivor by way of a social media account of the survivor, for instance by posting the message to the survivor's social media page or profile, or by sending a message to the survivor's social media account, then the system may provide the message to the survivor in such a manner.

Facilities to enable/provide one or more aspects described herein, for instance aspects of FIG. 5A, may include cloud-computing services such as System-as-a-Service (SaaS), Platform-as-a-Service (PaaS), and/or Infrastructure-as-a-Service (IaaS), as examples. Specific example cloud services that may be used include those provided by Amazon.com, Inc., for instance Amazon Simple Email Service (SES) for sending emails, Amazon Simple Notification Service (SNS) for sending text messages, Amazon Simple Queue Service (SQS) for queuing messages and transcoding notifications, Amazon Simple Storage Service (S3) for storing rich media assets, and Amazon Elastic Transcoder for transcoding audio/video contents (AMAZON.COM and AMAZON are trademarks of Amazon.com, Inc., Seattle, Wash., USA).

In examples where a user interacts with the system to verify the user's identity (i.e. as a survivor indicated by an account owner), the user may navigate to the website to verify his/her identity. In the example of FIG. 5A, the user-survivor clicks on a link in an email to navigate to the website and verify the survivor. A verify survivor module (510) may thereupon verify this survivor as legitimate, and therefore appropriate for provision of messages defined for that survivor.

Additionally, a user may interact with the system through a verify deceased module (508). In one example, the user clicks a link in a received email to be directed to the verify deceased module. The verify deceased module (508) may be used to indicate, validate, or invalidate an account owner's status as deceased, in accordance with the processing of FIG. 5B, described below. In examples where a user is required to have setup an account with the system before interacting therewith for purposes of indicating, validating, or invalidating an account owner's deceased status, the user may be required to signup/login and to provide this indication, validation, or invalidation via the user's own dashboard (523) or the account owner's dashboard (524).

Figure 5B:
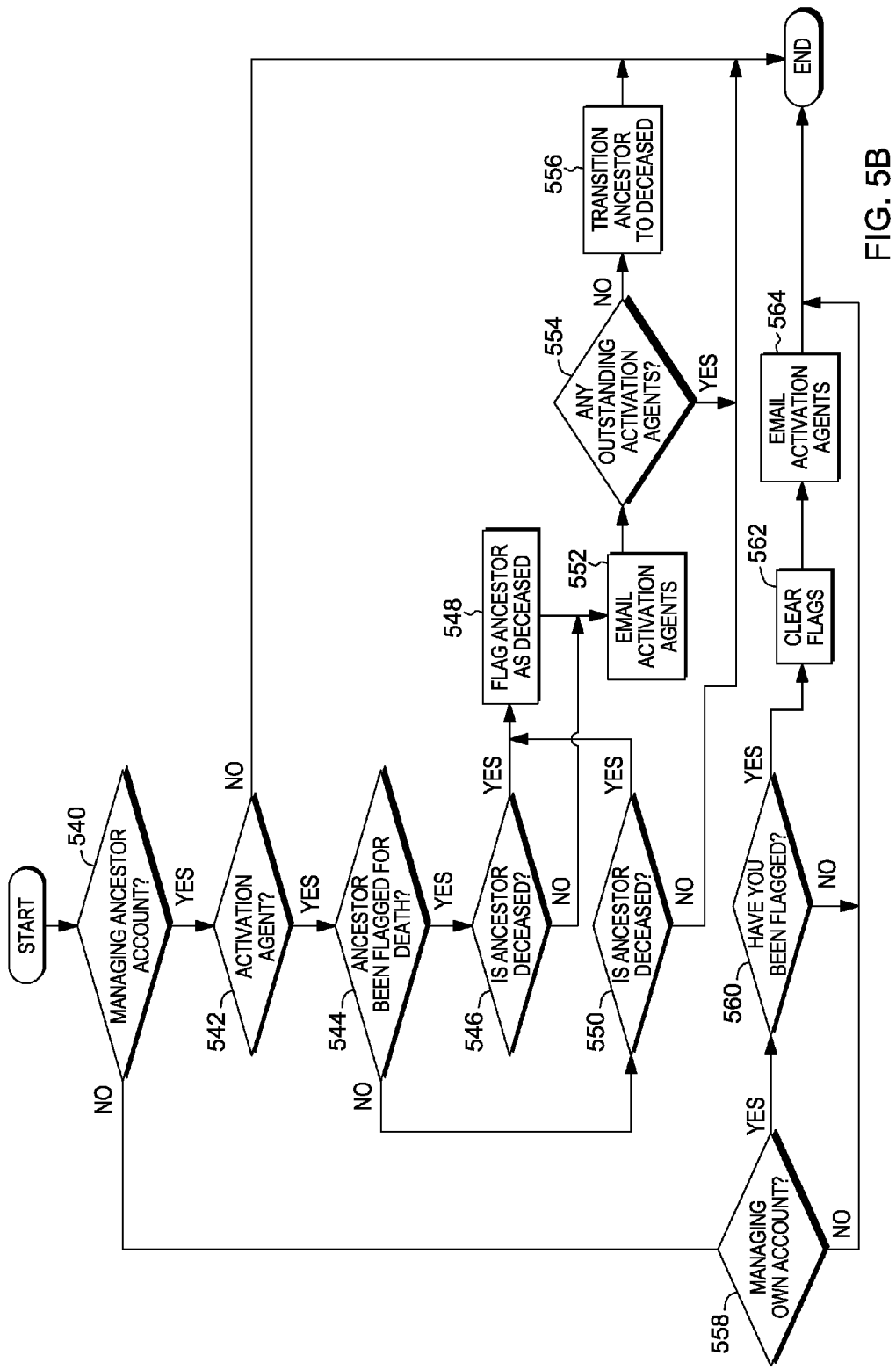
FIG. 5B depicts an example process flow for managing flagging of an account owner as deceased, in accordance with aspects described herein.

FIG. 5B depicts an example process flow for managing flagging of an account owner as deceased, in accordance with aspects described herein. In some examples, a user may attempt to indicate an account owner as being deceased. The account owner and the activation agents setup by that account owner may be sent an email notifying them that the account owner has been marked as being deceased.

The process begins by inquiring whether the user is attempting to manage another account owner's account (540). In this example the account is an ancestor's account. If not, an inquiry is made as to whether the user is managing his/her owner account (i.e. is an account owner) (558). If not, the process ends. Otherwise, the process continues by determining whether the user (managing his/her account owner) has been flagged as being deceased (560). If not, then the process ends, since the user is not to be able to indicate himself/herself as being deceased. If at (560) it is determined that the user has been flagged as being deceased, then that indication should be removed (i.e. because the user is not actually deceased). Any flag(s) indicating that the account owner is deceased are cleared (562), to indicate that the account owner (user) is not deceased. In this manner, an account owner can login and invalidate an attempted activation of the account owner's account for provision of predefined messages. After clearing the flag(s), the system can send an email to the activation agents specified on the user's account. The email could indicate that the account owner has invalidated any indication that the account owner is deceased.

Returning to inquiry (540), if it is determined that the user is attempting to manage another account owner's account (e.g. ancestor account), then it is determined whether this user has been setup (by the ancestor account owner) as an activation agent for that ancestor's account. If not, then the process ends, thereby preventing an unauthorized user from indicating deceased status for an account owner.

If the user is as an activation agent for the ancestor account, a determination is made as to whether the ancestor has already been flagged as deceased (544). If not, the user is prompted as to whether the ancestor is deceased (550). If the user indicates no, the process ends. Otherwise, if the user indicates that the ancestor is deceased, then the ancestor is flagged as deceased (548). In some examples, a flag corresponding to each activation agent for an owner's account is maintained in association with that owner's account to facilitate tracking whether, which, and how many activation agents have indicated that the account owner is deceased. In this example, then, the flag of the account owner's account, corresponding to the user (activation agent) who is indicating the account owner as deceased, is set.

Returning to (544), if the ancestor has already been flagged as deceased (for instance by another activation agent), then the user is prompted as to whether the ancestor is deceased. If so, the process continues by flagging that ancestor as deceased (548), i.e. by setting the flag of the deceased account owner's account, corresponding to the user (activation agent).

If at (546) the user indicates that the account owner is not deceased, then a discrepancy has arisen. That is, the account owner has already been indicated as being deceased (see 544—YES), but the user (activation agent) in the instant process has indicated that the account owner is not actually deceased (546—NO).

In the above case of a discrepancy, or after flagging an ancestor as being deceased (548), an email may be sent to the activation agents for the account owner (552), and may optionally be sent to the account owner. The email may be different depending on the situation from which the sending has arisen. In cases where the above-noted discrepancy exists (i.e. one or more activation agents have indicated the ancestor is deceased but another activation agent has contradicted that—YES at 544 and NO at 546), the email could notify the activation agents and the account owner (ancestor) of the discrepancy. The flags for the account owner may optionally be cleared at that point to invalidate all previously received indications that the account owner is deceased.

In the case where the email is being sent based on the user flagging the ancestor as deceased (548), the email could notify the activation agents and the account owner that the account owner has been flagged as being deceased.

In either case above, the email could indicate which activation agents have indicated that the account owner is deceased and which have indicated that the account owner is not deceased.

The email may be provided to the account owner as a way of prompting the account owner to respond if he/she is not actually deceased. In this manner, the email may start countdown of a timeframe of any desired period of time (3 days, one week, one month, etc.) for the account owner to reply before the system activates the owner's account for provision of messages. It may also inform the account owner which activation agent(s) have prematurely indicated the account owner as being deceased. The account owner may be impelled to reconsider his/her choice for activation agents associated with his/her account.

The process of FIG. 5B continues with a determination as to whether there are any outstanding activation agents (554). Outstanding in this sense refers to those still required for activating the account owner's account. The number of outstanding activation agents may be equal to or less than the number of total activation agents setup for the account owner's account. For instance, if all activation agents specified for an account must indicate that the account owner is deceased, then this inquiry determines whether there are any such activation agents who have not yet indicated that the account owner is deceased. In some cases, such as where an activation agent is known to pre-decease the account owner, it is desired to allow activation without unanimous indication from all activation agents that the account owner is deceased. In these cases, the system may not count an activation agent's contribution in the determination of whether there are outstanding activation agents. Additionally or alternatively, the system may regard positive indications that the owner is deceased from a threshold number of activation agents as being an authoritative indication that the account owner is deceased. That threshold number may be (i) a static number, such as three activation agents, (ii) a percentage of the total number of activation agents for the owner's account (such as 50%), or (iii) some combination of the two (such as 'the lesser of three or 50%').

If at (554) it is determined that no outstanding activation agents exist, then the account owner is transitioned to deceased (556), meaning the owner's account is activated for the provision of predefined messages. Otherwise, if at least one outstanding activation agent exists, then the process ends.

Figure 6:
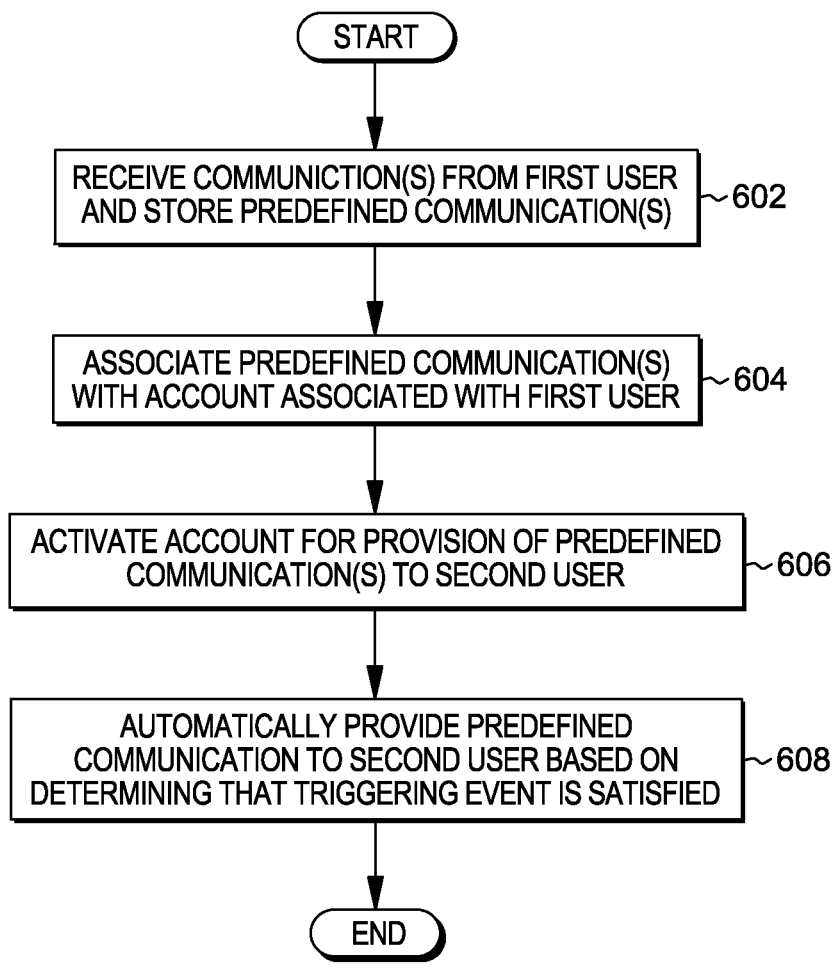
FIG. 6 depicts an example process for providing a predefined communication, in accordance with aspects described herein.

As described above, predefined communications may be provided to survivors based on activation of an account owner's account. FIG. 6 depicts an example process for providing a predefined communication, in accordance with aspects described herein. In some examples, the process of FIG. 6 is performed by one of more computer systems executing program instructions that cause the one or more computer systems to effectuate the processing.

FIG. 6 begins by receiving communication(s) from a first user and storing the communication(s) as predefined communication(s) (602). The predefined communication(s) are associated with an account associated with the first user (604). Sometime after receiving the predefined communication(s) and associating them with the account associated with the first user, the account is activated for provision of the predefined communication(s) to survivors which includes a second user predefined by the first user (606). In this regard, when a predefined communication is received from the first user and associated with the account associated with the first user, that account is inactive for provision of predefined communications to other users. When the account is inactive, the predefined communications associated with the account are withheld from provision to other users (such as survivors indicated by the first user), until the account is activated for provision of predefined communications.

The activation of the account may be based, at least in part, on activation agent(s) indicating that the account is to be activated for provision of predefined communications associated with the account. In some embodiments, the account is activated for provision of predefined communications based on the first user becoming deceased, and the indicating by an activation agent can indicate that the first user is deceased. The activation agent(s) can include any number of users predefined by the first user, and the account may become activated based on each user of those users individually indicating that the account is to be activated.

After an account is activated, a predefined communication is automatically provided to a second user based on a determination that a triggering event for providing the predefined communication has been satisfied (608), and the process ends. The triggering event may include a time-based triggering event, such as a date for sending the predefined communication to the second user. In this case, the time-based triggering event is satisfied when a current date (i.e. one on which processing is performed) matches the date for sending the predefined communication. Example dates for sending a predefined communication to the second user may include a holiday (specified by the first user) or a birthday of the second user, though numerous other dates are possible.

Additionally or alternatively, a time-based triggering event may include a duration of time that spans a time period, such as several days or weeks. In these scenarios, the predefined communication is to be provided to the second user spontaneously sometime during that duration of time. The specific time at which it is provided to the second user may be selected automatically by a computer.

In some embodiments, the triggering event is defined by the first user and associated with the predefined communication. Additionally or alternatively, a triggering event may be determined automatically (e.g. by a computer) based on an automated analysis of subject-matter of the predefined communication. For instance, if the first user defines a communication that says "Happy Birthday Son" and indicates that the message is to later be provided to the first user's son (who is the subject of the message), a computer may automatically determine that the message is a Happy Birthday wish to be appropriately provided on the birthday of that son. The triggering event (birthday of son) may be determined automatically by the computer in this case.

After the account is activated for the first user, any number of predefined communications may be provided to any number of second users. Processing and determination of when and which predefined communications are to be provided to second users may be ongoing.

Receiving of communications (602) may include receiving and storing many communications from the first user as many distinct predefined communications. These predefined communications may be grouped as a group of multiple predefined communications, with the grouping being based on a common user-selected category for each of those predefined communications of that group. A triggering event may be associated with this user-selected category for triggering provision of the multiple predefined communications in that group. The automatically providing the predefined communication to the second user may therefore include selecting that predefined communication from the multiple predefined communications for provision to the second user, based on determining that the triggering event has been satisfied. In this manner, a triggering event can trigger a selection and provision of a predefined communication of a group of similarly categorized predefined communications.

The selection of which predefined communication, of the group, to provide to the second user can include randomly selecting from the multiple predefined communications. Additionally or alternatively, the selecting may incorporate a temporal consideration in which most recently selected predefined communications, of the multiple predefined communications, are least likely to be the one selected, and least recently selected predefined communications, of the multiple predefined communications, are most likely to be the one selected. Further, the selecting may be based on a round-robin selection, in which the selected predefined communication is a next predefined communication of the multiple predefined communications for selection in the round-robin selection.

Figure 7:
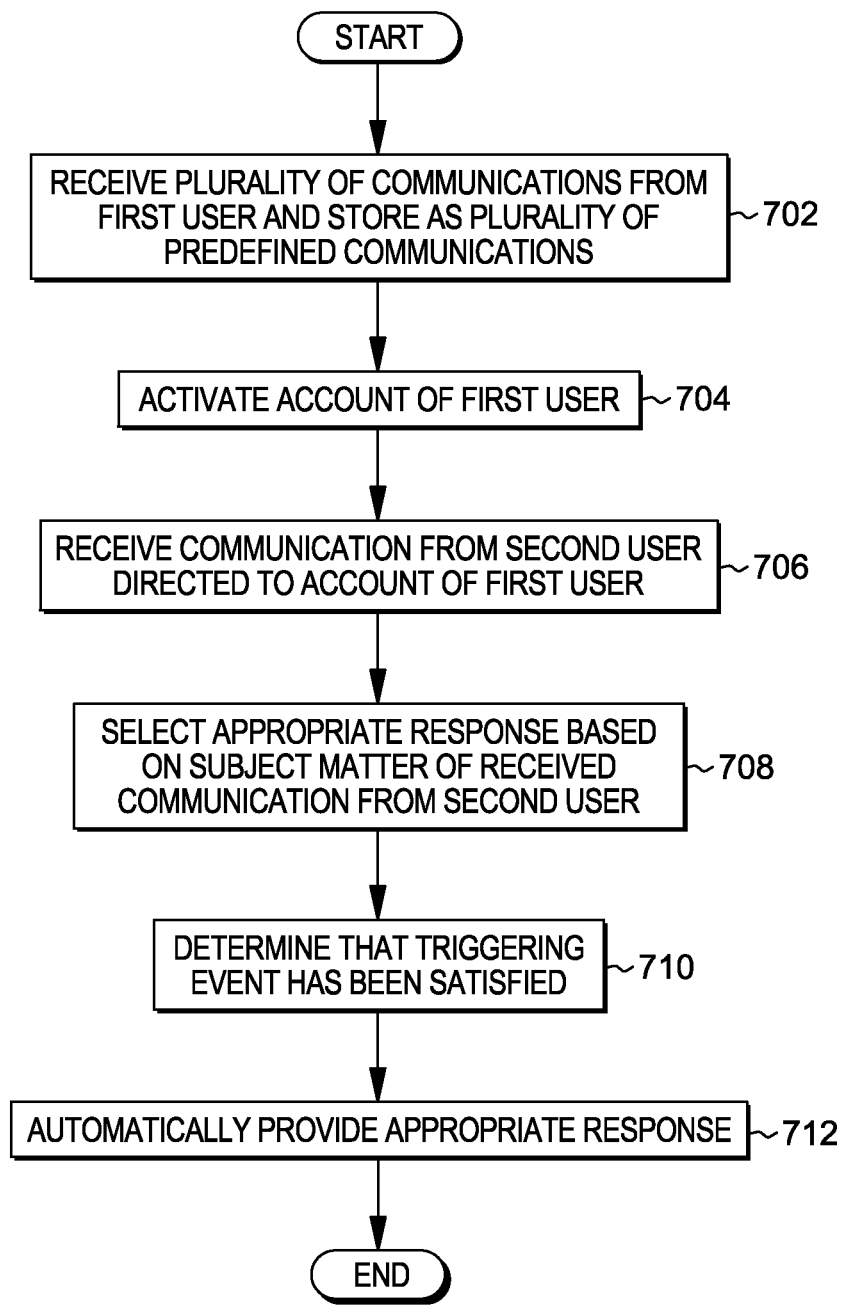
FIG. 7 depicts another example process for providing a predefined communication, in accordance with aspects described herein.

FIG. 7 depicts another example process for providing a predefined communication, in accordance with aspects described herein. FIG. 7 presents a more detailed example in which provision of predefined communications is triggered, in part, by a second user.

The process begins by receiving a plurality of communications from the first user, and storing the plurality of communications as a plurality of predefined communications (702), similar to (602) above. At some point, the account associated with the first user is activated (704). Following this activation, a communication is received from the second user (706), the communication being directed to the account associated with the first user.

At this point, a predefined communication may be automatically provided to the second user (as above). In accordance with aspects described herein, the predefined communication is selected from a plurality of available predefined communications. The selecting may include selecting, based on subject-matter of the communication received from the second user, an appropriate response from the plurality of predefined communications for responding to the communication from the second user (708), wherein the predefined communication sent to the second user is that selected appropriate response. Selecting the appropriate response from the plurality of predefined communications may include identifying multiple candidate appropriate responses for providing in response to the communication received from the second user. Identification of these multiple candidate appropriate responses may be made by determining that these responses are similar in subject-matter to the communication received from the second user. A selection rule may then be applied to select the appropriate response from the multiple identified candidate appropriate responses.

When an appropriate response has been selected, it may be determined that the triggering event for providing the appropriate response has been satisfied (710). In the above scenario, the triggering event may include the previous receipt of the communication from the second user and selection of the appropriate response. In any case, the appropriate response is then automatically provided to the second user (712).

In some embodiments, receiving the plurality of communications from the first user includes presenting to the first user one or more prompts, the one or more prompts prompting input of the plurality of communications. The plurality of communications that are received from the first user may be based on those one or more prompts. The one or more prompts may be subject-matter based prompts that prompt for input regarding a particular subject matter (such as "Provide words of encouragement for your son:" or "What is your earliest memory of fishing with your son?").

Responses to prompts may be saved as predefined communications. In some examples, each prompt of the one or more prompts may be associated with a respective one of more responses to that prompt, with each response of those responses being a communication of the plurality of communications received from the first user.

In some embodiments, receiving the communication from the second user (706) includes receiving from the second user a communication that identifies a prompt of the one or more prompts that were presented to the first user. In this manner, the second user can reach out by identifying a prompt for which the first user has provided at least one response. Automatically providing the predefined communication to the second user may include selecting an appropriate response to the prompt identified by the communication from the second user. The appropriate response may include a response of the one or more response provided by the first user for that identified prompt. The predefined communication provided back to the second user in response to the second user's identification of the prompt is one of the appropriate responses. In these cases, the triggering event for providing the appropriate response includes receipt of the communication from the second user and selection of the appropriate response.

In some specific embodiments of the receiving of the communication from the second user, the second user may be presented with a list of the one or more prompts (that were presented to the first user and responded-to by the first user). The list can indicate only those prompts for which available responses exist. The communication from the second user may be received based on the second user selecting a prompt from the presented list of one or more prompts, and the selected prompt (on which selection of the appropriate response for provision back to the second user is based) may be the prompt identified by the communication received from the second user.

In some specific examples, the one or more prompts presented to the first user include one or more questions to be answered by the first user. For each question of the one or more questions, the at least one response (by the first user) associated with the question may include at least one answer to the question. The prompt identified by the communication from the second user may include a question of the one or more questions, and the selected appropriate response to the question identified by the communication may include an answer of the at least one answer to the question, in which case the automatically provided appropriate response to the second user includes the selected appropriate answer.

The one or more questions presented to the first user for selection may have been specified by either the first user or the second user (or perhaps some other entity). In cases where the second user previously specifies the one or more questions to be answered by the first user, the communication from the second user can identify a question previously specified by that second user, and the appropriate response may include an answer (by the first user) to that question previously specified by that second user. In cases where the first user specifies the one or more questions to be answered by the first user, the communication from the second user identifies a question specified by the first user, and the appropriate response may include an answer to the question specified by the first user.

Those having ordinary skill in the art will recognize that aspects of the present invention may be embodied in one or more systems, one or more methods and/or one or more computer program products. In some embodiments, aspects of the present invention may be embodied entirely in hardware, entirely in software (for instance in firmware, resident software, micro-code, etc.), or in a combination of software and hardware aspects that may all generally be referred to herein as a "system" and include circuit(s) and/or module(s).

Figure 8:
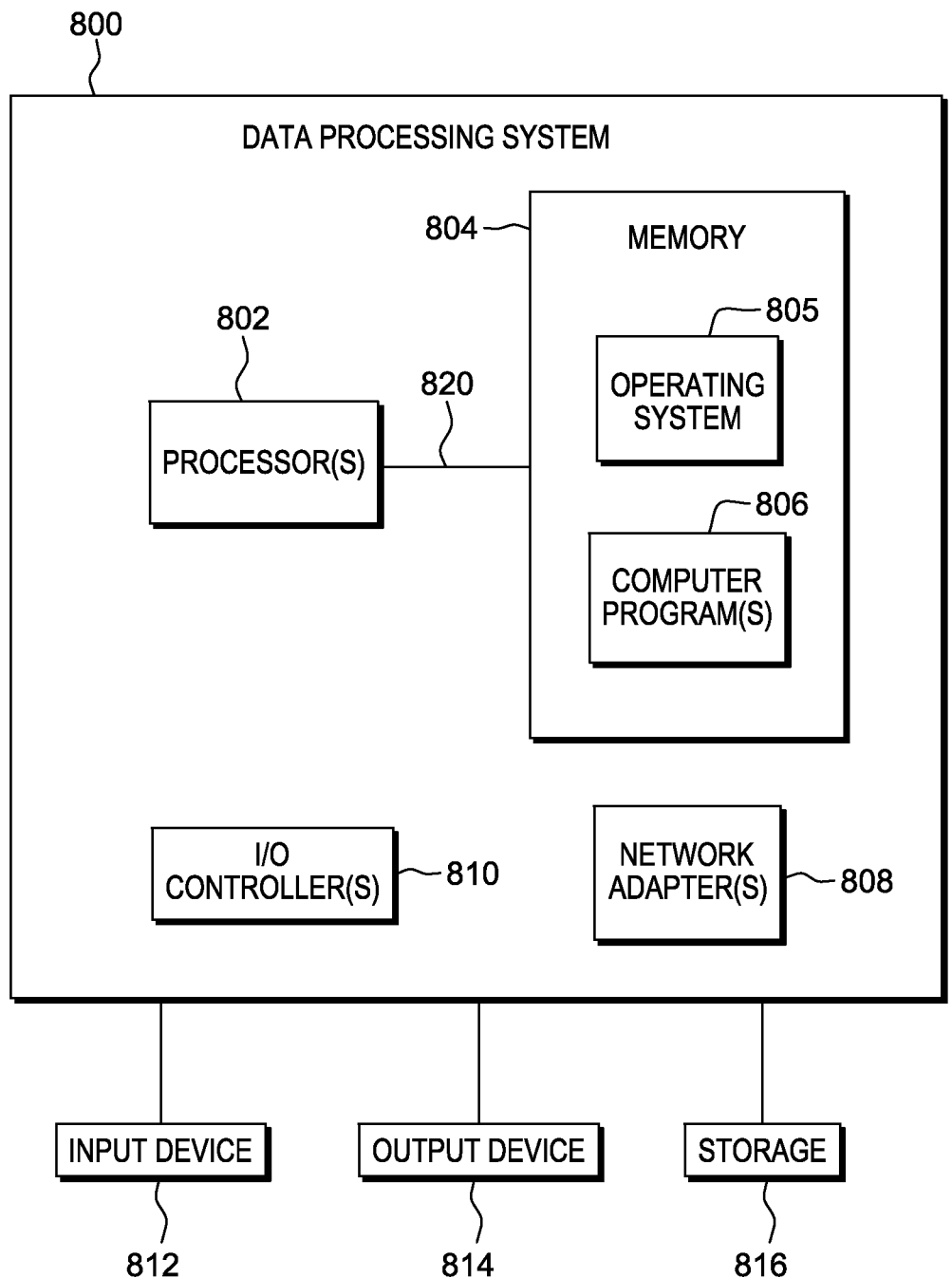
FIG. 8 depicts one example of a data processing system to incorporate and use aspects described herein.

FIG. 8 depicts one example of a data processing system to incorporate and use one or more aspects of the present invention. Data processing system 800 is suitable for storing and/or executing program code, such as program code for performing processes described above, and includes at least one processor 802 coupled directly or indirectly to memory 804 through a bus 820. In operation, processor(s) 802 obtain from memory 804 one or more instructions for execution by the processors. Memory 804 may include local memory employed during actual execution of the program code, bulk storage, and cache memories which provide temporary storage of at least some program code in order to reduce the number of times code must be retrieved from bulk storage during program code execution. A non-limiting list of examples of memory 804 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 804 includes an operating system 805 and one or more computer programs 806, such as one or more programs for execution to perform aspects described herein.

Input/Output (I/O) devices 812, 814 (including but not limited to keyboards, displays, pointing devices, etc.) may be coupled to the system either directly or through I/O controllers 810.

Network adapters 808 may also be coupled to the system to enable the data processing system to become coupled to other data processing systems through intervening private or public networks. Modems, cable modem and Ethernet cards are just a few of the currently available types of network adapters 508. In one example, network adapters 808 facilitate obtaining data from remote sources to facilitate aspects of the present invention.

Data processing system 800 may be coupled to storage 816 (e.g., a non-volatile storage area, such as magnetic disk drives, optical disk drives, a tape drive, etc.), having one or more databases. Storage 816 may include an internal storage device or an attached or network accessible storage. Computer programs in storage 816 may be loaded into memory 804 and executed by a processor 802.

The data processing system 800 may include fewer components than illustrated, additional components not illustrated herein, or some combination of the components illustrated and additional components. Data processing system 800 may include any computing device, such as a mainframe, server, personal computer, workstation, laptop, handheld computer or mobile device, tablet, telephony device, network appliance, virtualization device, storage controller, etc.

In addition, processes described above may be performed by multiple data processing systems 800, working as part of a clustered computing environment.

Additionally, data processing systems for facilitating aspects described herein can be configured to send and receive predefined communications of one of more types, such as texts, emails, telephone messages, faxes, and others. Computer telephony integration and other forms of tying a data processing system to various telecommunications and/or messaging systems may be employed.

In some embodiments, aspects of the present invention may take the form of a computer program product embodied in one or more computer readable medium(s). The one or more computer readable medium(s) may have embodied thereon computer readable program code. Various computer readable medium(s) or combinations thereof may be utilized. For instance, the computer readable medium(s) may include a computer readable storage medium, examples of which include (but are not limited to) one or more electronic, magnetic, optical, or semiconductor systems, apparatuses, or devices, or any suitable combination of the foregoing. Example computer readable storage medium(s) include, for instance: an electrical connection having one or more wires, a portable computer diskette, a hard disk or mass-storage device, a random access memory (RAM), read-only memory (ROM), and/or erasable-programmable read-only memory such as EPROM or Flash memory, an optical fiber, a portable compact disc read-only memory (CD-ROM), an optical storage device, a magnetic storage device (including a tape device), or any suitable combination of the above. A computer readable storage medium is defined to include a tangible medium that can contain or store program code for use by or in connection with an instruction execution system, apparatus, or device, such as a processor. The program code stored in/on the computer readable medium therefore produces an article of manufacture (such as a "computer program product") including program code.

Figure 9:
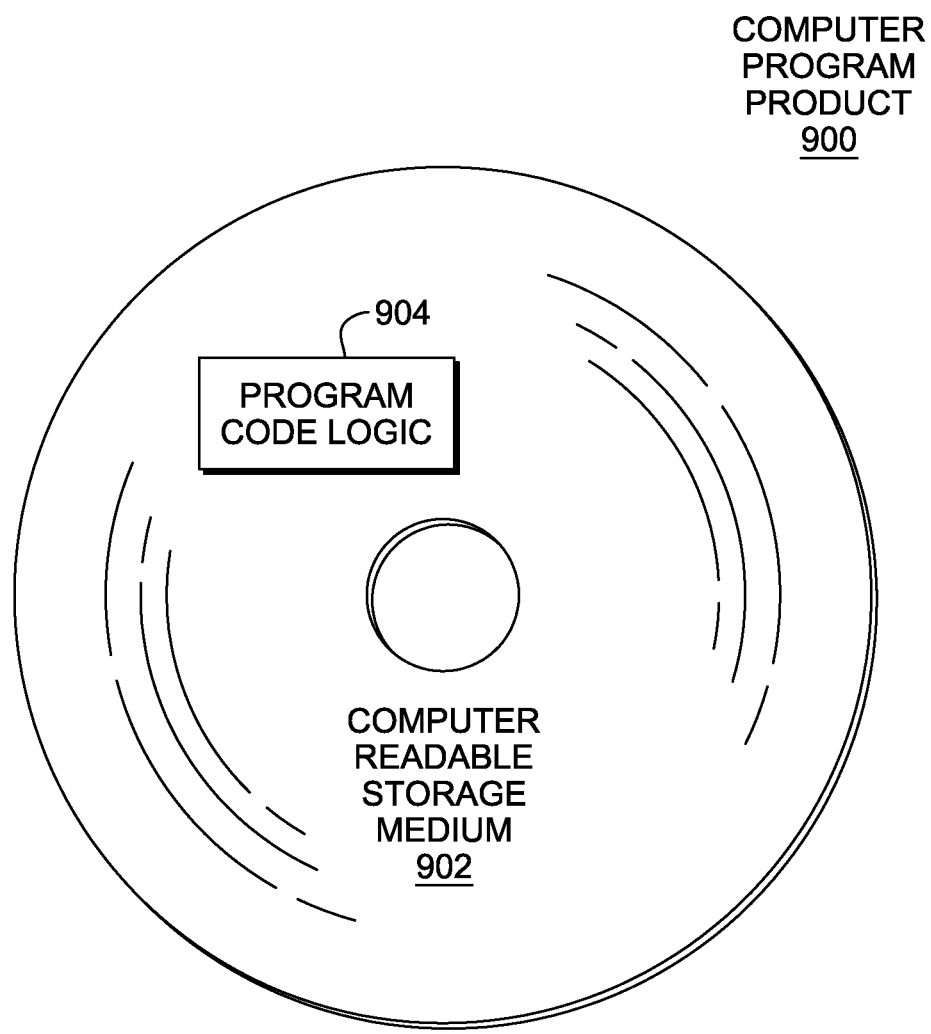
FIG. 9 depicts one example of a computer program product incorporating aspects described herein.

Referring now to FIG. 9, in one example, a computer program product 900 includes, for instance, one or more computer readable media 902 to store computer readable program code means or logic 904 thereon to provide and facilitate one or more aspects of the present invention.

Program code contained or stored in/on a computer readable medium can be obtained and executed by a data processing system (computer, computer system, etc. including a component thereof) and/or other devices to cause the data processing system, component thereof, and/or other device to behave/function in a particular manner. The program code can be transmitted using any appropriate medium, including (but not limited to) wireless, wireline, optical fiber, and/or radio-frequency. Program code for carrying out operations to perform, achieve, or facilitate aspects of the present invention may be written in one or more programming languages. In some embodiments, the programming language(s) include object-oriented and/or procedural programming languages such as C, C++, C#, Java, etc. Program code may execute entirely on the user's computer, entirely remote from the user's computer, or a combination of partly on the user's computer and partly on a remote computer. In some embodiments, a user's computer and a remote computer are in communication via a network such as a local area network (LAN) or a wide area network (WAN), and/or via an external computer (for example, through the Internet using an Internet Service Provider).

In one example, program code includes one or more program instructions obtained for execution by one or more processors. Computer program instructions may be provided to one or more processors of, e.g., one or more data processing system, to produce a machine, such that the program instructions, when executed by the one or more processors, perform, achieve, or facilitate aspects of the present invention, such as actions or functions described in flowcharts and/or block diagrams described herein. Thus, each block, or combinations of blocks, of the flowchart illustrations and/or block diagrams depicted and described herein can be implemented, in some embodiments, by computer program instructions.

The flowcharts and block diagrams depicted and described with reference to the Figures illustrate the architecture, functionality, and operation of possible embodiments of systems, methods and/or computer program products according to aspects of the present invention. These flowchart illustrations and/or block diagrams could, therefore, be of methods, apparatuses (systems), and/or computer program products according to aspects of the present invention.

In some embodiments, as noted above, each block in a flowchart or block diagram may represent a module, segment, or portion of code, which includes one or more executable instructions for implementing the specified behaviors and/or logical functions of the block. Those having ordinary skill in the art will appreciate that behaviors/functions specified or performed by a block may occur in a different order than depicted and/or described, or may occur simultaneous to, or partially/wholly concurrent with, one or more other blocks. Two blocks shown in succession may, in fact, be executed substantially concurrently, or the blocks may sometimes be executed in the reverse order. Additionally, each block of the block diagrams and/or flowchart illustrations, and combinations of blocks in the block diagrams and/or flowchart illustrations, can be implemented wholly by special-purpose hardware-based systems, or in combination with computer instructions, that perform the behaviors/functions specified by a block or entire block diagram or flowchart.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A method comprising:
   receiving, by a processor, a communication from a first user and storing the communication as a predefined communication;
   associating the predefined communication with an account associated with the first user;
   subsequent to the receiving and the associating, activating the account for provision of the predefined communication to a second user predefined by the first user; and
   automatically providing the predefined communication to the second user based on a determination that a triggering event for providing the predefined communication has been satisfied.

2. The method of claim 1, wherein the triggering event comprises a time-based triggering event.

3. The method of claim 2, wherein the time-based triggering event comprises a date for sending the predefined communication to the second user, wherein the time-based triggering event is satisfied when a current date matches the date for sending the predefined communication.

4. The method of claim 2, wherein the time-based triggering event comprises a duration of time spanning several days or weeks, and wherein the predefined communication is provided to the second user spontaneously sometime during the duration of time.

5. The method of claim 1, further comprising:
receiving additional communications from the first user and storing the additional communications as additional predefined communications;
grouping the predefined communication and the additional predefined communications as a group of multiple predefined communications, the grouping based on a common user-selected category for the predefined communication and the additional predefined communications, wherein the triggering event is associated with the user-selected category for triggering provision of the multiple predefined communications, and wherein the automatically providing the predefined communication to the second user comprises selecting the predefined communication from the multiple predefined communications for provision to the second user, based on determining that the triggering event has been satisfied.

6. The method of claim 5, wherein the selecting comprises randomly selecting from the multiple predefined communications.

7. The method of claim 1, wherein receiving the communication comprises receiving the communication as one communication of a plurality of communications received from the first user, and wherein the method further comprises storing the plurality of communications as a plurality of predefined communications.

8. The method of claim 7, further comprising, after activation of the account:
receiving, from the second user, a communication directed to the account associated with the first user, wherein the automatically providing the predefined communication to the second user comprises:
selecting, based on subject-matter of the communication received from the second user, an appropriate response from the plurality of predefined communications for responding to the communication from the second user;
determining that the triggering event for providing the appropriate response has been satisfied, the triggering event comprising receipt of the communication from the second user and selection of the appropriate response; and
automatically providing the appropriate response to the second user, wherein the predefined communication automatically provided to the second user is the appropriate response.

9. The method of claim 8, wherein selecting the appropriate response from the plurality of predefined communications comprises:
identifying multiple candidate appropriate responses for providing in response to the communication received from the second user, the multiple candidate appropriate responses being determined to be similar in subject-matter to the communication received from the second user; and
applying a selection rule to select the appropriate response from the multiple identified candidate appropriate responses.

10. The method of claim 7, further comprising presenting to the first user one or more prompts, the one or more prompts prompting input of the plurality of communications, wherein the plurality of communications are received from the first user based on the one or more prompts.

11. The method of claim 10, wherein the one or more prompts are each subject-matter based prompts.

12. The method of claim 10, further comprising:
associating each prompt of the one or more prompts with at least one response to the prompt, each response of the at least one response associated with the prompt being a communication of the plurality of communications received from the first user; and
after activation of the account, receiving, from the second user, a communication that identifies a prompt of the one or more prompts, wherein the automatically providing the predefined communication to the second user comprises:
selecting an appropriate response to the prompt identified by the communication, the appropriate response comprising a response of the at least one response provided by the first user for the identified prompt;
determining that the triggering event for providing the appropriate response has been satisfied, the triggering event comprising receipt of the communication from the second user and selection of the appropriate response; and
automatically providing the appropriate response to the second user, wherein the predefined communication automatically provided to the second user is the appropriate response.

13. The method of claim 12, further comprising presenting to the second user a list of the one or more prompts, the list indicating prompts for which available responses exist, wherein the communication from the second user is received based on the second user selecting a prompt from the presented list of one or more prompts, and wherein the selected prompt is the prompt identified by the communication received from the second user.

14. The method of claim 12, wherein the one or more prompts comprise one or more questions to be answered by the first user, wherein, for each question of the one or more questions, the at least one response associated with the question comprises at least one answer by the first user to the question, wherein the prompt identified by the communication from the second user comprises a question of the one or more questions, wherein the selected appropriate response to the question identified by the communication comprises an answer of the at least one answer to the question, and wherein the appropriate response automatically provided to the second user comprises the selected appropriate answer.

15. The method of claim 14, wherein the second user previously specifies the one or more questions to be answered by the first user prior to presentation thereof to the first user for answering, wherein the communication from the second user identifies a question previously specified by the second user, and wherein the appropriate response comprises an answer to the question previously specified by the second user.

16. The method of claim 14, wherein the first user specifies the one or more questions to be answered by the first user, wherein the communication from the second user identifies a question specified by the first user, and wherein the appropriate response comprises an answer to the question specified by the first user.

17. The method of claim 1, wherein the triggering event is defined by the first user and associated with the predefined communication.

18. The method of claim 1, wherein the triggering event is determined automatically based on an automated analysis of subject-matter of the predefined communication.

19. The method of claim 1, wherein, when the predefined communication is received from the first user and associated with the account associated with the first user, the account associated with the first user is inactive for providing predefined communications to other users, and wherein the method further comprises, when the account is inactive, withholding the predefined communications associated with the account from provision to the other users until the account is activated for provision of predefined communications.

20. The method of claim 1, wherein activating the account is based, at least in part, on at least one activation agent indicating that the account is to be activated for provision of predefined communications associated with the account.

21. The method of claim 20, wherein the at least one activation agent comprises multiple users predefined by the first user, wherein the account is activated based on each user of the multiple users individually indicating that the account is to be activated.

22. The method of claim 21, wherein the indicating by the least one activation agent indicates that the first user is deceased.

23. The method of claim 1, wherein the account is activated for provision of the predefined communication based on the first user being indicated as deceased.

24. A system comprising:
a processor; and
a memory in communication with the processor, wherein the system is configured to perform:
   receiving a communication from a first user and storing the communication as a predefined communication;
   associating the predefined communication with an account associated with the first user;
   subsequent to the receiving and the associating, activating the account for provision of the predefined communication to a second user predefined by the first user; and
   automatically providing the predefined communication to the second user based on a determination that a triggering event for providing the predefined communication has been satisfied.

25. A computer program product comprising:
a tangible computer readable storage medium storing program instructions for execution by a processor to perform a method comprising:
   receiving a communication from a first user and storing the communication as a predefined communication;
   associating the predefined communication with an account associated with the first user;
   subsequent to the receiving and the associating, activating the account for provision of the predefined communication to a second user predefined by the first user; and
   automatically providing the predefined communication to the second user based on a determination that a triggering event for providing the predefined communication has been satisfied.

* * * * *